(12) United States Patent
Dirusso

(10) Patent No.: US 11,898,499 B1
(45) Date of Patent: Feb. 13, 2024

(54) POWER TRANSFER SYSTEMS AND METHODS FOR AIRCRAFT ENGINES

(71) Applicant: The Boeing Company, Arlington, VA (US)

(72) Inventor: Joseph M. Dirusso, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/181,833

(22) Filed: Mar. 10, 2023

(51) Int. Cl.
*F02C 7/36* (2006.01)

(52) U.S. Cl.
CPC .......... *F02C 7/36* (2013.01); *F05D 2220/323* (2013.01); *F05D 2240/60* (2013.01); *F05D 2260/40* (2013.01)

(58) Field of Classification Search
CPC .. F02C 7/36; F05D 2220/323; F05D 2240/60; F05D 2260/40
See application file for complete search history.

(56) References Cited

U.S. PATENT DOCUMENTS

| 11,591,967 | B2 | 2/2023 | Foutch et al. |
| 2021/0348564 | A1 | 11/2021 | Mackin et al. |

FOREIGN PATENT DOCUMENTS

RU 2407903 C2 * 12/2010 ............. F02C 3/107

* cited by examiner

*Primary Examiner* — Jacob M Amick
*Assistant Examiner* — Charles J Brauch
(74) *Attorney, Agent, or Firm* — HANLEY, FLIGHT & ZIMMERMAN, LLC

(57) ABSTRACT

An example aircraft engine includes a fan and a gas turbine engine to drive the fan. The gas turbine engine has a low-pressure drive shaft operatively coupling a low-pressure turbine and a low-pressure compressor and a high-pressure drive shaft operatively coupling a high-pressure turbine and a high-pressure compressor. The aircraft engine includes a power transfer system including a differential having an input shaft, a first output shaft in gear with the low-pressure drive shaft, and a second output shaft in gear with the high-pressure drive shaft, and a gearbox between the low-pressure drive shaft of the gas turbine engine and the first output shaft of the differential. The gearbox is configured to provide power transfer through the differential from the low-pressure drive shaft to the high-pressure drive shaft.

20 Claims, 11 Drawing Sheets ated in connection with an
POWER TRANSFER SYSTEMS AND METHODS FOR AIRCRAFT ENGINES

FIELD OF THE DISCLOSURE

This disclosure relates generally to aircraft and, more particularly, to power transfer systems and methods for aircraft engines.

BACKGROUND

Commercial aircraft typically extract bleed air from a compressor of an aircraft engine to provide pressurized air for various aircraft systems. For example, commercial aircraft often employ bleed air to provide air supply for an environmental control system to pressurize a passenger cabin of the aircraft and/or thermal anti-icing systems to provide heated air for anti-icing applications. The bleed air is often extracted from a higher stage of the compressor that provides bleed air having a pressure and/or temperature above that demanded by the system(s) and then reduced in pressure, via a pressure regulating valve, prior to providing the bleed air to the system(s).

SUMMARY

An example aircraft engine disclosed herein includes a fan and a gas turbine engine to drive the fan. The gas turbine engine has a low-pressure drive shaft operatively coupling a low-pressure turbine and a low-pressure compressor and a high-pressure drive shaft operatively coupling a high-pressure turbine and a high-pressure compressor. The example aircraft engine also includes a power transfer system including a differential having an input shaft, a first output shaft in gear with the low-pressure drive shaft, and a second output shaft in gear with the high-pressure drive shaft, and a gearbox between the low-pressure drive shaft of the gas turbine engine and the first output shaft of the differential. The gearbox is configured to provide power transfer through the differential from the low-pressure drive shaft to the high-pressure drive shaft.

An example aircraft disclosed herein includes an aircraft system that operates on bleed air, a gas turbine engine having a high-pressure drive shaft and a low-pressure drive shaft, and a power transfer system including an auxiliary turbine, one or more fluid lines coupled between a bleed port on the gas turbine engine, the auxiliary turbine, and the aircraft system, and a differential having an input shaft, a first output shaft, and a second output shaft. The auxiliary turbine is coupled to the input shaft. The second output shaft is in gear with the high-pressure drive shaft of the gas turbine engine, such that during a first mode of operation, power is transferred from the auxiliary turbine to the high-pressure drive shaft of the gas turbine engine.

An example method disclosed herein includes disengaging a brake of an auxiliary turbine. The auxiliary turbine is coupled to an input shaft of a differential. The differential includes the input shaft, a first output shaft in gear with a low-pressure drive shaft of a gas turbine engine of an aircraft engine, and a second output shaft in gear with a high-pressure drive shaft of the gas turbine engine. The method also includes operating one or more valves to direct bleed air from the gas turbine engine through the auxiliary turbine, wherein power extracted by the auxiliary turbine is transferred to the high-pressure drive shaft of the gas turbine engine.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
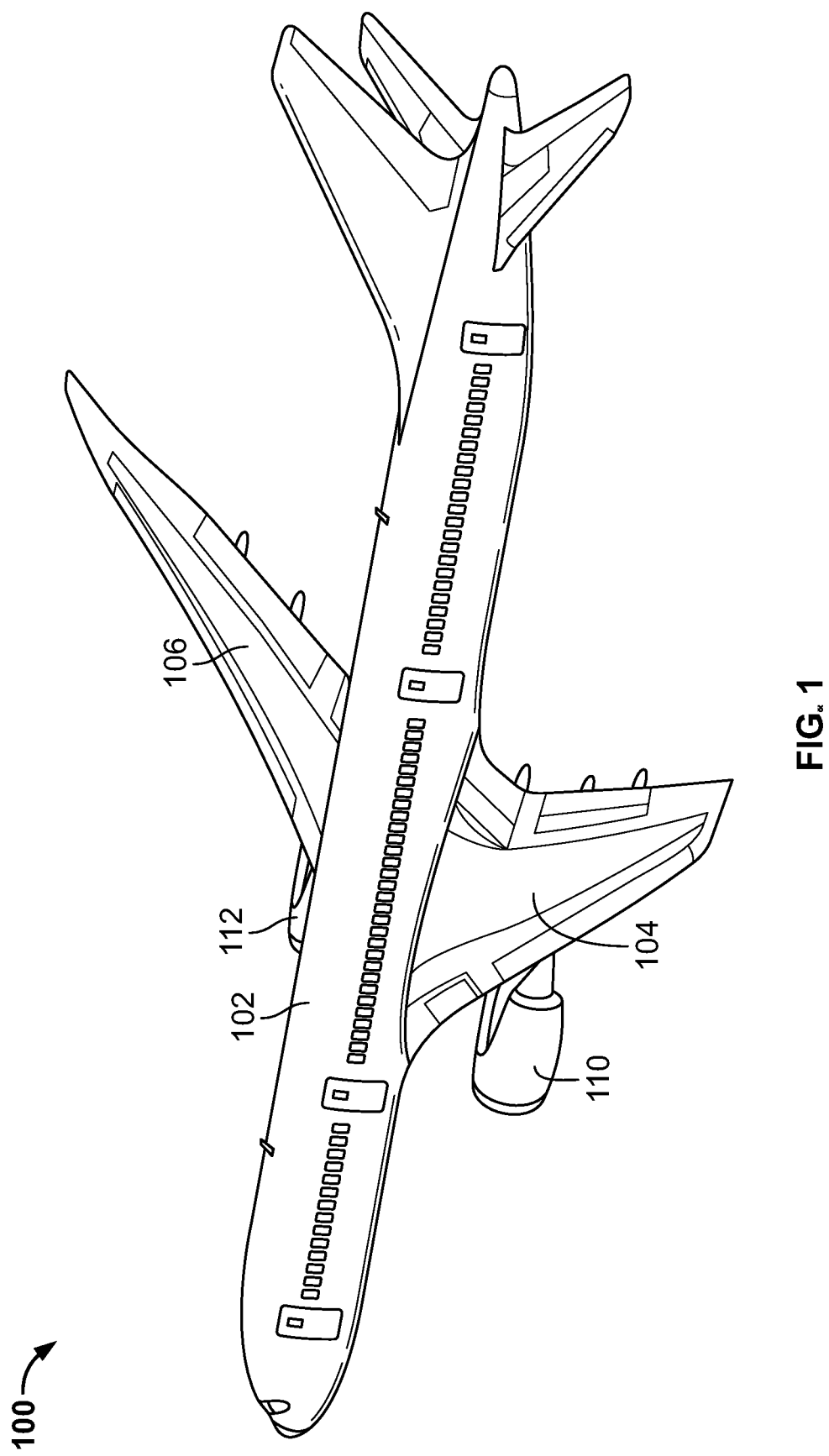
FIG. 1 illustrates an example aircraft in which the examples disclosed herein can be implemented.

Disclosed herein are example systems and methods that utilize a unique arrangement of an auxiliary turbine and a differential gearbox to provide bleed energy recovery, provide power transfer between the low-pressure and high-pressure drive shafts of an engine, and operate as a starter for starting an engine. The example systems can operate in different modes during phases of operation of the engine and provide benefits in each mode.

An example power transfer system disclosed herein includes a differential (sometimes referred to as a differential gearbox or gear train) having an input shaft coupled to an auxiliary turbine, a first output shaft coupled to a low-pressure drive shaft of a gas turbine engine, and a second output shaft coupled to a high-pressure drive shaft of the gas turbine engine. The differential includes a gearset that splits power between the input shaft and the two output shafts. The differential also enables one of the output shafts to rotate in a reverse direction to provide power to the other output shaft. The differential mechanically couples the high-pressure and low-pressure drive shafts, which are typically independently rotatable of each other. In some examples disclosed herein, the low-pressure drive shaft is coupled to the first output shaft by a reverse gear ratio. As such, depending on the speed, the differential transfers power from low-pressure drive shaft to the high-pressure drive shaft. This is advantageous because it reduces the surge margin of the engine and improves stability margins, which enables engines to be designed for more efficient operation.

In some example modes disclosed herein, the auxiliary turbine can provide bleed energy recovery and/or stability to the engine. For example, during some phases of flight, bleed air is extracted from one or more stages of the high-pressure compressor of the engine to be provided to one or more systems that utilize bleed air (e.g., an environment control system (ECS), a wing anti-icing system, etc.). Bleed air is extracted from the compressor at higher pressure and temperature than demanded by the systems(s). To reduce the pressure and temperature of the bleed air, the example power transfer system directs the high-pressure bleed air through the auxiliary turbine. This reduces the pressure and temperature of the bleed air to the desired or demanded pressure and temperature. Further, the power generated by the auxiliary turbine is transferred to through the differential to the high-pressure drive shaft of the engine. This significantly improves fuel efficiency of the engine by adding power back into the engine, rather than wasting the power by using a pressure regulator to reduce the pressure of the bleed air.

Also, the example power transfer system disclosed herein can be used to start the engine. For example, high-pressure air (e.g., from an auxiliary power unit (APU) or ground cart) can be routed through the auxiliary turbine. The auxiliary turbine rotates the high-pressure drive shaft, via the differential, to start the engine. Therefore, the example system eliminates the need for a separate pneumatic starter on the engine. This significantly reduces weight and costs associated with the engine. Further, the system does not require a clutch to disengage the auxiliary turbine. This further reduces weight and costs associated with the aircraft engine compared to known engines that require a clutch to disengage the starter turbine.

FIG. 1 illustrates an example aircraft 100 in which the examples disclosed herein can be implemented. The aircraft 100 includes a fuselage 102, a first wing 104 coupled to the fuselage 102, and a second wing 106 coupled to the fuselage 102. The fuselage 102 defines a cabin where the passengers and/or cargo are carried. In the illustrated example, the aircraft 100 includes a first aircraft engine 110 (referred to herein as the first engine 110) carried by the first wing 104 and a second aircraft engine 112 (referred to herein as the second engine 112) carried by the second wing 106. The first and second engines 110, 112 generate thrust to fly the aircraft 100. In other examples, the aircraft 100 may include only one engine or may include more than two engines. The engine(s) can be carried on the first and/or second wings 104, 106 and/or another structure on the aircraft 100 (e.g., on the tail section of the fuselage 102). The example aircraft 100 includes one or more aircraft systems that utilize and/or operate on high-pressure air, such as bleed air. For example, the aircraft 100 may include an environmental control system (ECS) to provide temperature and pressure regulated air to the cabin. Further, the aircraft 100 may include one or more thermal anti-icing systems, such as a wing anti-icing system and/or an engine anti-icing system.

Figure 2:
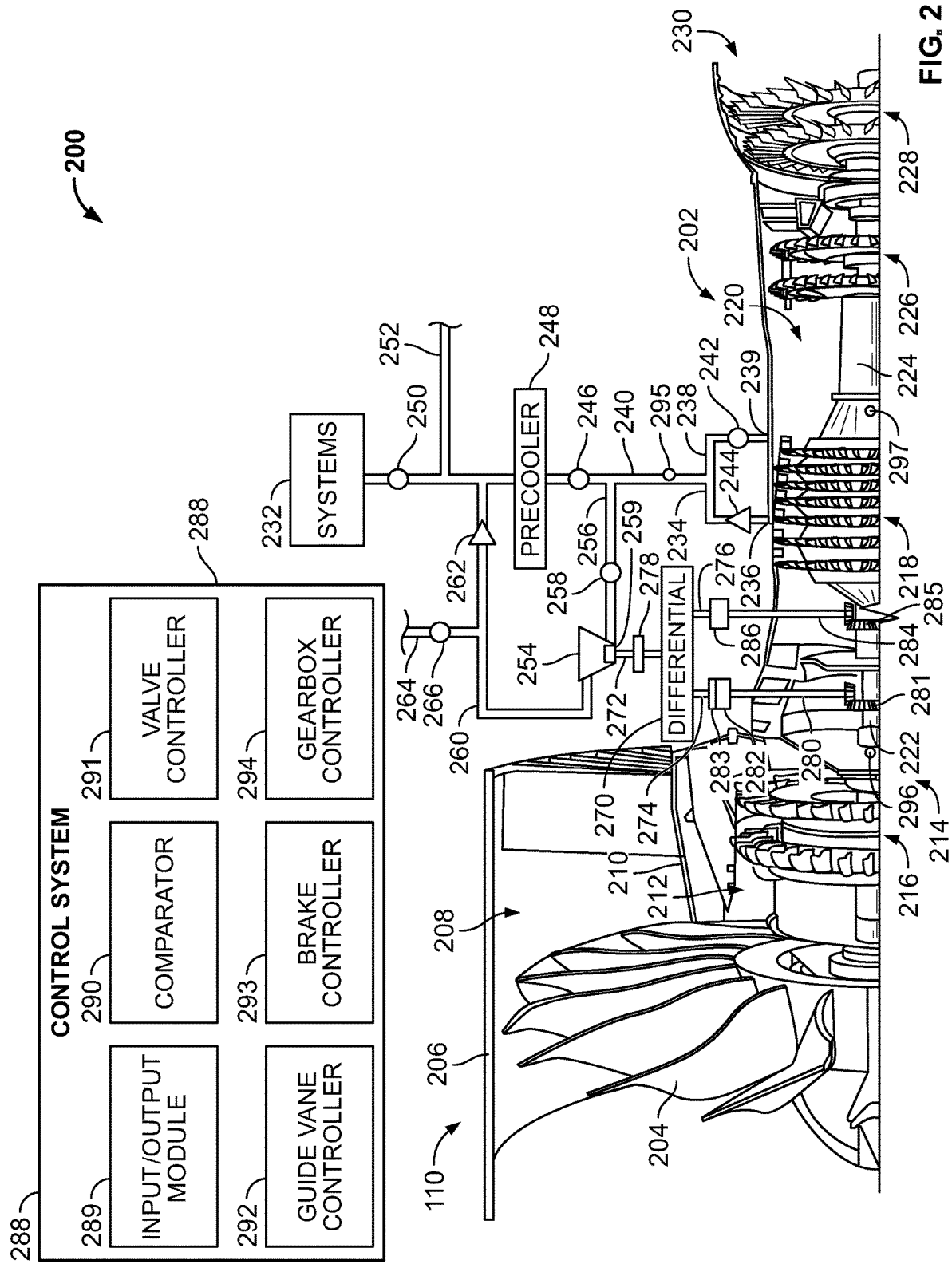
FIG. 2 is a schematic illustration of an example power transfer system including an example auxiliary turbine and example differential implemented in connection with an engine of the example aircraft of FIG. 1.

FIG. 2 is a schematic illustration of an example power transfer system 200 (referred to herein as "the system 200") constructed in accordance with the teachings of this disclosure. The example system 200 can also be referred to as a bleed air system and/or auxiliary turbine and differential system. The example system 200 is configured to provide pressurized bleed air to one or more devices or systems on the aircraft 100 as well transfer and/or provide power into the shaft(s) of the first engine 110, as disclosed in further detail herein. The example system 200 of FIG. 2 is shown as being implemented in connection with the first engine 110 (shown in a partial cutaway view) of the example aircraft 100 (FIG. 1). In some examples, the system 200 is considered as part of the first engine 110. In other examples, the system 200 can be considered a system that is separate from the first engine 110. A similar system 200 can be implemented in connection with the second engine 112 (FIG. 1). Thus, in some examples, two of the example system 200 are implemented on the aircraft 100 (FIG. 1). The example system 200 is only described in connection with the first engine 110. However, it is understood that any of the example aspects disclosed in connection with the first engine 110 can likewise apply to the second engine 112.

In the illustrated example of FIG. 2, the first engine 110 is implemented as turbofan-type of engine. The first engine 110 includes a gas turbine engine 202 (sometimes referred to as an engine core or turbomachinery) and a fan 204. The gas turbine engine 202 is operably coupled to and drives (e.g., rotates) the fan 204 to produce thrust. The fan 204 rotates within a nacelle 206 of the first engine 110. A fan duct 208 (e.g., a bypass channel) is defined between the nacelle 206 and an outer wall 210 (sometimes referred to as a core cowl) of the gas turbine engine 202. As the fan 204 rotates, the fan 204 produces airflow. A portion of the airflow flows through the fan duct 208 and bypasses the gas turbine engine 202 to produce forward thrust and another portion of the airflow is provided to the gas turbine engine 202 for combustion.

The gas turbine engine 202 operates by drawing air through a core air intake 212 (at a fore end of the gas turbine engine 202) and into a compressor 214 of the gas turbine engine 202. In particular, when the gas turbine engine 202 is running, a portion of the airflow from the fan duct 208 is diverted through the core air intake 212 and into the compressor 214 of the gas turbine engine 202. The compressor 214 can include multiple compressor sections. For example, the compressor 214 of FIG. 2 is a dual-axial compressor that includes two compressors: a first compressor 216 and a second compressor 218. Each of the first and second compressors 216, 218 can include multiple compressor stages that progressively increase the pressure of the air as the air flows from the core air intake 212 to a combustion chamber 220. In this example, the first compressor 216 is a low-pressure compressor (LPC), referred to herein as the LPC 216, and the second compressor 218 is a high-pressure compressor (HPC), referred to herein as the HPC 218. The LPC 216 and the HPC 218 include one or more stages of rotor vanes or blades that incrementally increase the pressure of the air. The LPC 216 and the HPC 218 are driven by separate drive shafts. In particular, the LPC 216 is coupled to a low-pressure drive shaft 222, and the HPC 218 is coupled to a high-pressure drive shaft 224. For simplicity, the low-pressure drive shaft 222 is referred to herein as the N1 shaft 222, and the high-pressure drive shaft 224 is referred to herein as the N2 shaft 224.

As mentioned above, air from the core air intake 212 flows through the LPC 216 to the HPC 218, which increases the pressure of the air. After exiting the HPC 218, the highly pressurized air is provided to the combustion chamber 220 where fuel is injected and mixed with the highly pressurized air and ignited. The high energy airflow exits the combustion chamber 220 and flows through a first turbine 226 and a second turbine 228. The high energy airflow turns the blades of the first and second turbines 226, 228. The first turbine 226 is a high-pressure turbine (HPT), referred to herein as the HPT 226, and the second turbine 228 is a low-pressure turbine (LPT), referred to herein as the LPT 228. The N1 shaft 222 (the low-pressure drive shaft) operatively couples the LPT 228 and the LPC 216. As such, rotation of the LPT 228 drives the LPC 216. Similarly, the N2 shaft 224 (the high-pressure drive shaft) operatively couples the HPT 226 and the HPC 218. As such, rotation of the HPT 226 drives the HPC 218. The N1 shaft 222 is coaxial with and extends through the N2 shaft 224.

After exiting the LPT 228, the high energy air is exhausted via a nozzle 230, aftward. The air mixes with the accelerated airflow provided by the fan 204 in the fan duct 208. The combined air produces forward thrust that propels the aircraft 100 in a forward direction. While in this example the first engine 110 is implemented as a turbofan engine, the example system 200 can be similarly implemented in connection with other types of engines, such as a turbo-prop engine or a turbo-jet engine.

The aircraft 100 includes one or more aircraft system(s) 232 that utilize or operate on pressurized air, such as bleed air (e.g., high pressure air extracted from the engine). The system(s) 232 can include, for example, an environmental control system (ECS), which provides pressurized and temperature controlled air to the passenger cabin, a wing anti-icing system, an engine anti-icing system, a generator, and/or other systems or devices. The system 200 extracts bleed air from the gas turbine engine 202 and provides the highly pressurized air to the system(s) 232 for operation. To meet the pressure and/or temperature demands of the various system(s) 232, bleed air can be extracted from one or more locations along the HPC 218 and then cooled and/or depressurized before reaching the system(s) 232. For example, in this example, the system 200 includes a first fluid line 234 coupled to a first bleed port 236 (e.g., at an intermediate stage of the HPC 218) on the gas turbine engine 202 and a second fluid line 238 coupled to a second bleed port 239 (e.g., at a final stage of the HPC 218) on the gas turbine engine 202. The second bleed port 239 is downstream of the first bleed port 236 and, thus, supplies higher pressure air than the first bleed port 236. The first and second fluid lines 234, 238 join together at a third fluid line 240, which routes the bleed air to the system(s) 232. Depending on the operating condition of the first engine 110 and/or the demand of the system(s) 232, the system 200 can supply bleed air from one or both of the first bleed port 236 and the second bleed port 239.

As shown in the illustrated example of FIG. 2, the system 200 includes a valve 242 that is coupled to the second fluid line 238. In some examples, the valve 242 is a shut-off valve (e.g., a high-pressure shut-off valve HPSOV). To prevent back flow pressure from entering the first bleed port 236, the system 200 includes a check valve 244 (e.g., a back-flow preventer, an intermediate port check valve (IPCV)) coupled to the first fluid line 234. The check valve 244 prevents pressurized bleed air from flowing toward the first bleed port 236 when higher pressure bleed air is present in the third fluid line 240.

In the illustrated example, the system 200 includes a valve 246 and a precooler 248 (e.g., a heat exchanger) coupled to the third fluid line 240. In some examples, the valve 246 is a pressure-reducing shut-off valve (PRSOV), which is configured to regulate the pressure of the bleed air to a pre-set or predetermined pressure value and provide fluid flow shut-off. The precooler 248 reduces the temperature of the bleed air prior to reaching the system(s) 232. In the illustrated example, the system 200 includes another valve 250 coupled to the third fluid line 240 before the system(s) 232. The valve 250 may be used to prevent air flow to the system(s) 232 during certain modes or phases of flight, such as during an engine start mode, disclosed in further detail herein. In the illustrated example, a fourth fluid line 252 is coupled to the third fluid line 240 and can be used to supply high-pressure air during the engine start mode.

In the illustrated example of FIG. 2, the system 200 includes an auxiliary turbine 254 (which may also be referred to as a recovery turbine), which can be used to add power back into the gas turbine engine 202, as disclosed in further detail herein. The system 200 includes a fifth fluid line 256 coupled between an inlet of the auxiliary turbine 254 and the third fluid line 240, upstream of the valve 246 and the precooler 248. The system 200 includes a valve 258 (e.g., a shut-off valve) coupled to the fifth fluid line 256 to control the flow of air to the auxiliary turbine 254. In the illustrated example, the auxiliary turbine 254 includes variable inlet guide vanes 259, which can be modulated to affect the air flow into the auxiliary turbine 254. As shown in FIG. 2, the system 200 includes a sixth fluid line 260 between an outlet of the auxiliary turbine 254 and the third fluid line 240, downstream of the valve 246 and the precooler 248. The system 200 includes a check valve 262 is coupled to the sixth fluid line 260. The check valve 262 prevents higher pressure air in the third fluid line 240 from flowing through the sixth fluid line 260 to the outlet of the auxiliary turbine 254. In the illustrated example, the system 200 includes a seventh fluid line 264 coupled to the sixth fluid line 260. The seventh fluid line 264 can be used to direct air overboard, as disclosed in further detail herein. The system 200 includes a valve 266 coupled to the seventh fluid line 264. As such, the system 200 includes one or more fluid lines coupled between one or more bleed ports on the gas turbine engine 202, the auxiliary turbine 254, and the system(s) 232. Bleed air and/or other high-pressure air can be directed or routed through the fluid lines during different modes of operation, as disclosed in further detail herein.

In the illustrated example of FIG. 2, the system 200 includes a differential 270, which may be referred to as a differential gearset or differential gearbox. The differential 270 has an input shaft 272, a first output shaft 274, a second output shaft 276, and a plurality of gears (e.g., a gearset or gear train) that transfers power between the shafts 272, 274, 276, as shown in further detail in connection with FIG. 3. While referred to as output shafts, the output shafts 274, 276 can also be used as input or driving shafts, as disclosed in further detail herein. In the illustrated example, the auxiliary turbine 254 is coupled to the input shaft 272. As such, when the auxiliary turbine 254 is operating (e.g., being powered/driven by high-pressure air), the auxiliary turbine 254 drives the input shaft 272, which drives one or both of the output shafts 274, 276. In the illustrated example, a brake 278 is coupled to the input shaft 272. The brake 278 can be used to stop the auxiliary turbine 254 during certain modes of operation, as disclosed in further detail herein.

In this example, the first output shaft 274 is in gear or coupled to the N1 shaft 222 (the low-pressure drive shaft) of the gas turbine engine 202, and the second output shaft 276 is in gear or coupled to the N2 shaft 224 (the high-pressure drive shaft) of the gas turbine engine. As such, the differential 270 mechanically couples the N1 and N2 shafts 222, 224. This enables the N1 shaft 222 to drive or provide power to the N2 shaft 224 during certain modes of operation.

In the illustrated example of FIG. 2, the system 200 includes a first radial shaft 280 that is in gear or coupled to the N1 shaft 222. In some examples, the first radial shaft 280 is coupled to the N1 shaft 222 by bevel gears 281. The system 200 includes a first gearbox 282 between the first output shaft 274 of the differential 270 and the first radial shaft 280. As such, the gearbox 282 is between the N1 shaft 222 and the first output shaft 274. Therefore, the first output shaft 274 of the differential 270 is in gear with the N1 shaft 222 (e.g., via the first gearbox 282, the first radial shaft 280, and the bevel gears 281). The first gearbox 282 implements a first gear ratio between the first output shaft 274 of the differential 270 and the first radial shaft 280 (and, thus, the N1 shaft 222). In some examples, the first gearbox 282 implements a fixed gear ratio. In other examples, the first gearbox 282 is a variable gear ratio gearbox that can change the gear ratio between the first output shaft 274 and the N1 shaft 222. For example, the first gearbox 282 may be a multi-speed transmission or a continuously variable transmission. The first gearbox 282 is configured to provide power transfer through the differential 270 from the N1 shaft 222 to the N2 shaft 224.

In the illustrated example, the system 200 includes a one-way clutch 283 (e.g., a sprag clutch, a roller clutch) between the first gearbox 282 and the first output shaft 274. The one-way clutch 283 is a passive clutch that allows rotation in one direction but not the reverse direction. In some examples disclosed herein, the first gearbox 282 provides a negative (reverse) gear ratio between the N1 shaft 222 (the low-pressure drive shaft) and the first output shaft 274 of the differential 270. The one-way clutch 283 limits or prevents the differential 270 from driving the N1 shaft 222 in a reverse direction during an engine start mode, as disclosed in further detail herein. In other examples, the clutch 283 can be implemented as an active clutch that physically disconnects or separates the shafts.

In the illustrated example, the system 200 includes a second radial shaft 284 that is in gear with or coupled to the N2 shaft 224. In some examples, the second radial shaft 284 is coupled to the N2 shaft 224 by bevel gears 285. The system 200 includes a second gearbox 286 between the second output shaft 276 and the second radial shaft 284. As such, the second gearbox 286 is between the N2 shaft 224 and the second output shaft 276. Therefore, the second output shaft 276 of the differential 270 is in gear with the N2 shaft 224 (e.g., via the second gearbox 286 and the second radial shaft 284). The second gearbox 286 implements a second gear ratio between the second output shaft 276 of the differential 270 and the second radial shaft 284 (and, thus, the N2 shaft 224). In some examples, the second gearbox 286 implements a fixed gear ratio. In other examples, the second gearbox 286 is a variable gear ratio gearbox that can change the gear ratio between the second output shaft 276 and the N2 shaft 224. For example, the second gearbox 286 may be a multi-speed transmission or a continuously variable transmission.

In the illustrated example of FIG. 2, the example system 200 includes a control system 288 to operate the various devices and control the operation of the system 200. The control system 288 can be implemented by processor circuitry, such as the processor circuitry 1012 of the processor platform 1000 disclosed in connection with FIG. 10. The control system 288 is communicatively coupled to one or more sensors (disclosed in further detail below), the valves 242, 246, 250, 258, 266, the variable inlet guide vanes 259, the brake 278, the gearboxes 282, 286, and/or any other device that controls and/or monitors various parameters of the system 200.

In the illustrated example, the control system 288 includes an input/output module 289, a comparator 290, a valve controller 291, a guide vane controller 292, a brake controller 293, and a gearbox controller 294. The input/output module 289 receives signals from one or more sensors measuring one or more parameters of the system 200. The comparator 290 compares the measured values of the parameter(s) to one or more thresholds or threshold ranges. Based on whether the parameter(s) satisfy the thresholds or threshold ranges, the controllers 291, 292, 293, 294 can operate one or more of the devices to achieve a desired result, such as starting the first engine 110, supplying pressurized bleed air to the system(s) 232, and/or transferring power from the auxiliary turbine 254 to the gas turbine engine 202.

The valve controller 291 controls the states of the valves 242, 246, 250, 258, 266. For instance, any of the valves 242, 246, 250, 258, 266 can be operated between an open state and a closed state and any state therebetween (e.g., half open) to control the flow of fluid through the respective passageways. One or more of the valves 242, 246, 250, 258, 266 may also be set to reduce a pressure of the air flowing through the respective valve.

The guide vane controller 292 controls the variable inlet guide vanes 259 at the inlet of the auxiliary turbine 254. The variable inlet guide vanes 259 can be adjusted to increase or decrease the load on the auxiliary turbine and, thus, affect the temperature and pressure drop across the auxiliary turbine 254. This also affects the resulting output power of the auxiliary turbine 254. The brake controller 293 controls the brake 278. The brake 278 is operable between a disengaged state in which the input shaft 272 (and, thus, the auxiliary turbine 254) is freely rotatable, and an engaged state in which the input shaft 272 (and, thus, the auxiliary turbine 254) is locked. The gearbox controller 294 controls the first and second gearboxes 282, 286. For example, the gearbox controller 294 can change the gear ratios provided by the first and second gearboxes 282, 286.

As disclosed above, the system 200 can include one or more sensors (e.g., temperature sensors, pressure sensors, flow sensors, speed sensors, etc.) to measure and/or monitor one or more parameters of the system 200, such as temperature, pressure, flow rate, shaft speed, etc. For example, the system 200 includes a sensor 295 coupled to the third fluid line 240. The sensor 295 can measure one or more parameters such as temperature, pressure, and/or flow rate of the air through the third fluid line 240. The system 200 can similarly include sensors at other locations, such as the first fluid line 234, the second fluid line 238, the fourth fluid line 252, and so forth. The example sensors can measure the parameters of the air at different points in the system 200. In the illustrated example, the system 200 includes sensors 296, 297 for measuring the speed of the N1 and N2 shafts 222, 224, respectively. The control system 288 can also be in communication with other airplane controllers, such as the environmental control system (ECS) controller and/or the electronic engine control unit. This enables the control system 288 to switch modes or operations based on the current state or functioning of the aircraft.

Figure 3:
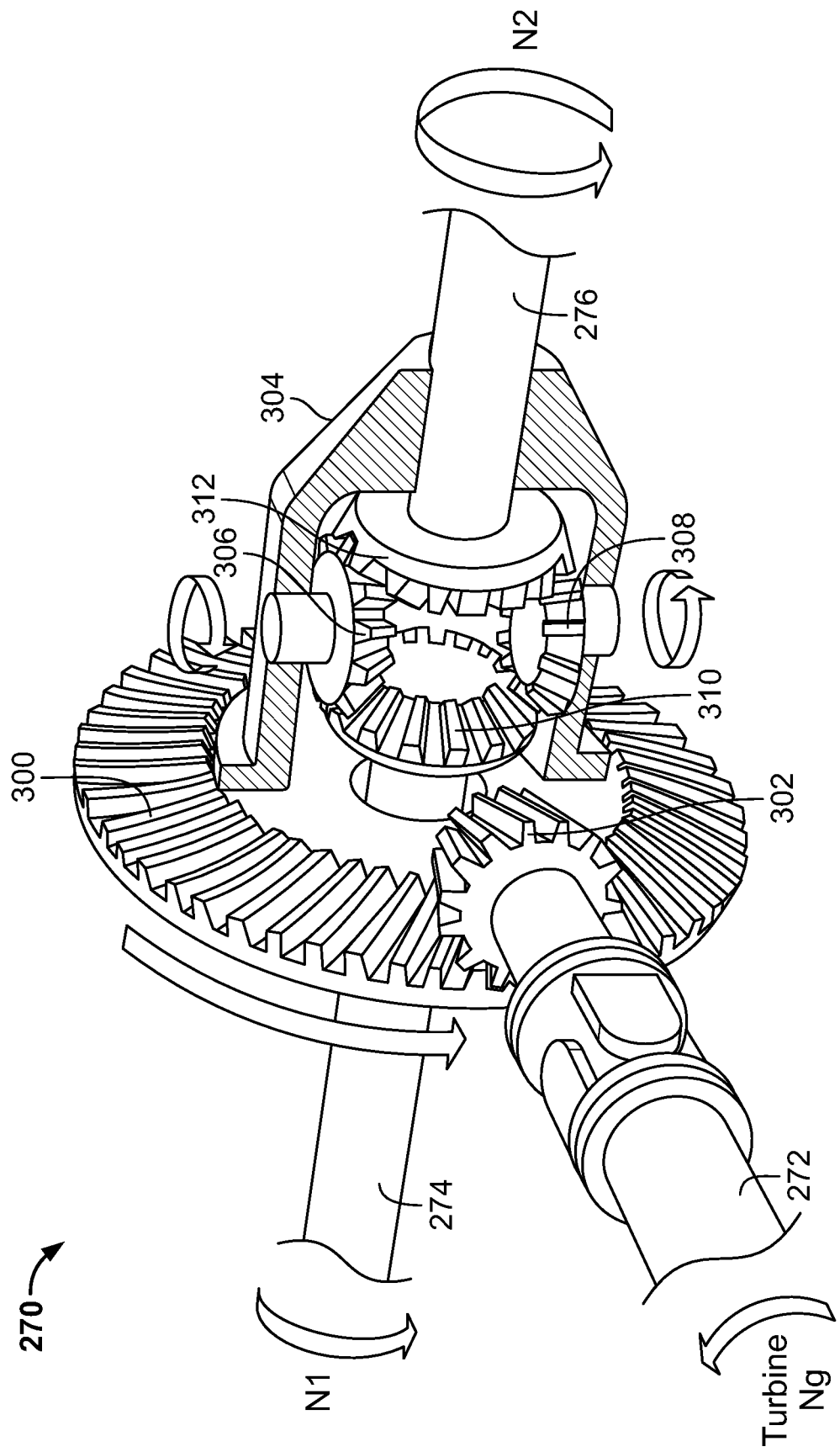
FIG. 3 shows an example physical implementation of the example differential of the example power transfer system FIG. 2.

FIG. 3 illustrates an example physical implementation of the differential 270. As disclosed above, the differential 270 incudes a gearset that transfers power between the input shaft 272, the first output shaft 274, and the second output shaft 276. The input shaft 272 is coupled to the auxiliary turbine 254 (labeled as Ng), the first output shaft 274 is coupled to the N1 shaft 222 (labeled N1), and the second output shaft 276 is coupled to the second output shaft 276 (labeled N2).

In the illustrated example of FIG. 3, the differential 270 includes a crown wheel 300. A pinion 302 on the input shaft 272 is meshed with the crown wheel 300. Therefore, when the input shaft 272 is rotated (e.g., by the auxiliary turbine 254), the pinion 302 causes the crown wheel 300 to rotate. In the illustrated example, the differential 270 includes a cage 304 coupled to the crown wheel 300 and two spider gears 306, 308 coupled to the cage 304. As the crown wheel 300 rotates, the cage 304 and the spider gears 306, 308 rotate with the crown wheel 300. Further, the spider gears 306, 308 are rotatable about their own axes relative to the cage 304. The first output shaft 274 has a first gear 310 meshed with the first and second spider gears 306, 308, and the second output shaft 276 has a second gear 312 meshed with the first and second spider gears 306, 308 opposite the first gear 310.

In general, a torque applied to the input shaft 272 (Ng) will result in torques being applied to both output shafts 274, 276 (N1, N2). These applied torques will result in power transfers that are a function of the rotational speeds of each shaft. For example, as shown in FIG. 3, the input shaft 272 (Ng) is rotating with a torque being applied in the direction of rotation, as shown by the arrow, which rotates the crown wheel 300. The crown wheel 300 rotates the cage 304 and the spider gears 306, 308. This causes the first and second output shafts 274, 276 (N1, N2) to have a corresponding toque applied, as shown by the arrows. If the first and second output shafts 274, 276 (N1, N2) are rotating at the same speed, then power is split evenly between the first and second output shafts 274, 276 (N1, N2). This is because power is proportional to the product of torque times rotational speed. However, if one of the output shafts 274, 276 (N1, N2) is slowed down (e.g., because of a resistance), additional power is transferred to the other output shaft 274, 276 (N1, N2) by virtue of the arrangement of the cage 304 and the spider gears 306, 308. Further, if one of the output shafts 274, 276 (N1, N2) is rotated in the opposite direction (from external torque and power being applied to the output shaft), this increases rotation of the first and second spider gears 306, 308, which transfers additional power and speed to the other output shaft 274, 276 (N1, N2). Similarly, if the input shaft 272 is stopped, and one of the output shafts 274, 276 (N1, N2) is rotated in a first direction, all of the power and speed is transferred to the other output shaft 274, 276 (N1, N2), which is rotated in the opposite direction. FIG. 3 shows one example gearset or gear train for the differential 270. In other examples, the differential 270 can implement other types of gearsets or gear trains, such as a planetary gear system.

Figure 4:
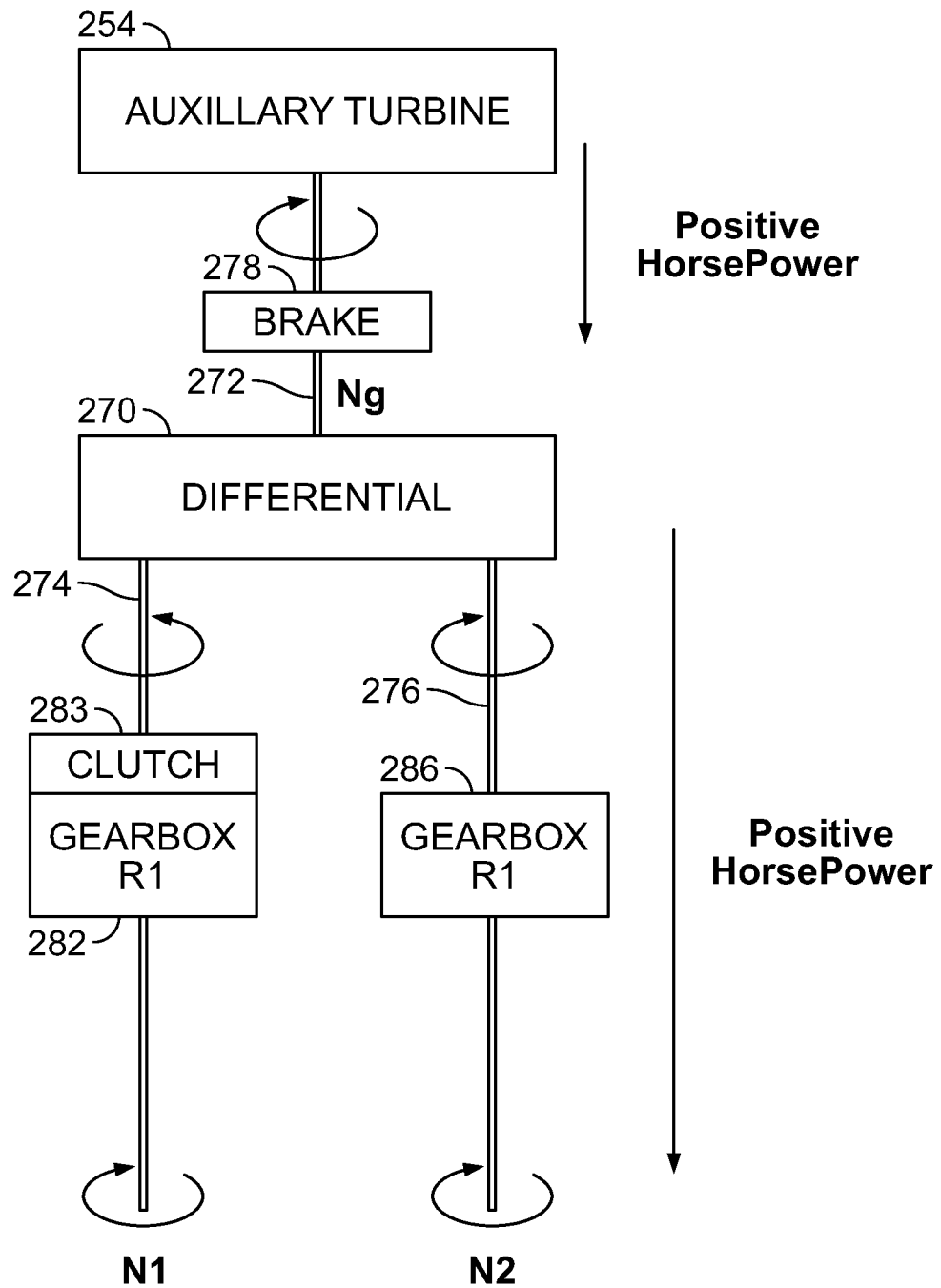
FIG. 4 is a schematic illustration of the example differential of FIGS. 2 and 3.

FIG. 4 is a schematic showing the auxiliary turbine 254, the differential 270, the shafts 272, 274, 276, the brake 278, the gearboxes 282, 286, and the one-way clutch 283. As disclosed above, the input shaft 272 (labeled Ng) is coupled to the auxiliary turbine 254, the first output shaft 274 is in gear with the N1 shaft 222 (labeled N1), and the second output shaft 276 is in gear with to the N2 shaft 224 (labeled N2). The first gearbox 282 provides a first gear ratio R1 between the first output shaft 274 and the N1 shaft 222, and the second gearbox 286 provides a second gear ratio R2 between the second output shaft 276 and the N2 shaft 224. In this example, the first gear ratio R1 is a negative (reverse) gear ratio (e.g., −5), and the second gear ratio R2 is a positive gear ratio (e.g., +2). As such, rotation of the N1 shaft 222 drives the first output shaft 274 in the opposite direction, which is opposite the direction of the second output shaft 276. In some examples, the first gear ratio R1 is −5. Therefore, for every rotation of the N1 shaft 222, the first output shaft 274 rotates 5 times in the reverse direction. As disclosed above, due to the gearset in the differential 270, this results in a transfer of power from the first output shaft 274 to the second output shaft 276 and, thus, power is transferred through the differential 270 from the N1 shaft 222 (the low-pressure drive shaft) to the N2 shaft 224 (the high-pressure drive shaft). Therefore, the first gearbox 282 is configured to provide power transfer through the differential 270 from the N1 shaft 222 to the N2 shaft 224.

Some known systems include a bleed power recovery turbine coupled to the N2 shaft 222 for bleed recovery and/or an air turbine starter coupled to the N2 shaft 222 for starting the engine, but do not include a differential and are not connected through a differential to the N1 shaft 222. Below is table showing a comparison of a known system (N2 connected starter) to the example power transfer system 200. The scenario below assumes the first gear ratio R1 is −5 and the second gear ratio R2 is +2.

TABLE 1

| | Bleed/Starter Turbine Coupled to N2 | Power Transfer System 200 |
|---|---|---|
| R1 | 0 | −5 |
| R2 | 1 | 2 |
| Starter Cutout | 8,300 RPM | 8,300 RPM |
| N1 at idle | 1,500 RPM | 1,500 RPM |
| N2 at idle | 12,500 RPM | 12,500 RPM |
| Ng at idle | 12,500 RPM | 5,000 RPM |
| Effect of Adding 100 HPx to gearbox via starter | N1 = 0 HP N2 = 100 HP | N1 = −150 HPx N2 = +250 HPx |
| | Gearbox speed is above starter cutout at idle | Differential slows down gearbox speed at idle and result in power transfer from the N1 shaft to the N2 shaft |

Below are example equations for the gear ratios, speed balance, torque balance, and horsepower.

Gear Ratios
R1=differential pad input:N1
Speed Balance
N1*R1+N2*R2=Ng
Torque Balance
T1/R2=T2/R2=Tg
Horsepower
HP=Torque*RPM/5254

In the equations above, torque is represented in ft-lbf. The first gear ratio R1 of −5 means that for every positive N1 revolution, the auxiliary turbine 254 rotates backwards 5 times (assuming N2 is not turning). For an engine at idle, with N1=1,500 RPM and N2=12,500 RPM, this would result in an auxiliary turbine speed of 5,000 RPM. If air is applied to the auxiliary turbine 254, the auxiliary turbine 254 creates a positive torque (Tg), which results in a negative torque seen on N1 and a positive torque seen on N2. As such, this configuration enables power transfer from the N1 shaft 222 to the N2 shaft 222, while also adding power from the auxiliary turbine 254 to the N2 shaft 224. For example, as shown in the table above, an additional 150HP is transferred from the N1 shaft 222 to the N2 shaft 224. Between idle and take-off, the N1 shaft 222 increase in speed about 5×, while the N2 shaft 224 only increases in speed about 2×.

Further, known air turbine starters are connected to the N2 shaft only with a fixed gear ratio. The starters are required to disengage before idle is reached to prevent overspeeding the starter. Therefore, known systems require a clutch to disconnect the starter from the N2 shaft before idle. However, in the example system 200, R1 is −5 and R2=1, then the starter speed is reduced at ground idle, and running bleed air through the auxiliary turbine 254 results in power being transferred from the N1 shaft 222 to the N2 shaft 224. Therefore, the example system 200 does not require a clutch to disengage the auxiliary turbine 254. Instead, the auxiliary turbine 254 can be powered by the bleed air or stopped (via the brake 278), as disclosed in further detail herein.

In some examples, the first and second gearboxes provide fixed gear ratios R1 and R2. In other examples, the first and second gearboxes 282, 286 can provide variable gear ratios (VGR). The VGRs can be controlled by the gearbox controller 294. This enables precise control of the speed of the auxiliary turbine 254 as well as the power and speed transferred between the N1 and N2 shafts 222, 224. This is highly desired for lower power engine conditions.

Figure 5:
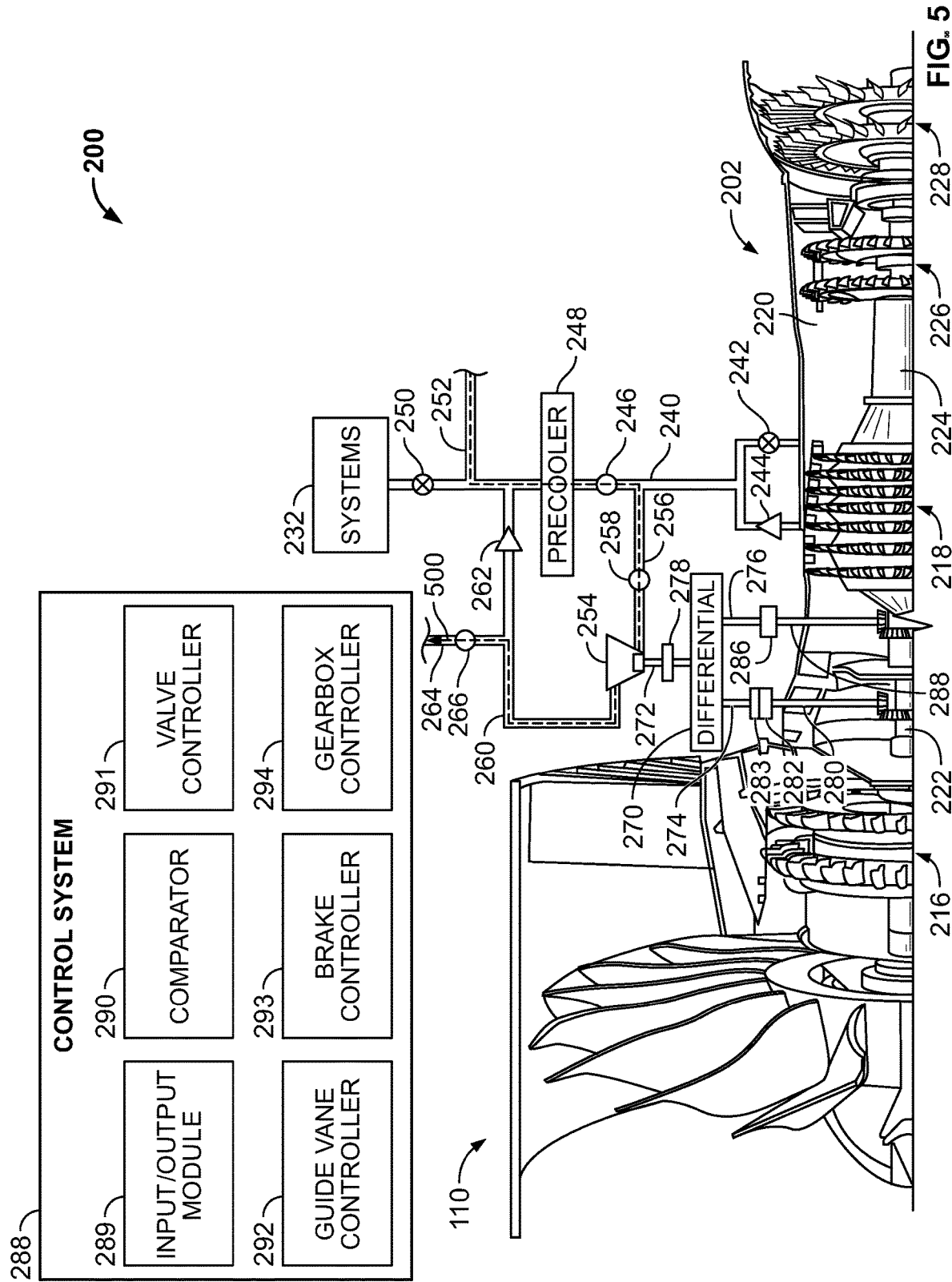
FIG. 5 shows the example power transfer system of FIG. 2 in an engine start mode.

FIG. 5 shows the example system 200 during a first mode, referred to herein as an engine start mode, in which the system 200 is used to start the first engine 110. In this mode, the aircraft 100 is on the ground and the first engine 110 is not running. In the engine start mode, the auxiliary turbine 254 is used to accelerate the N2 shaft 224 (the high-pressure drive shaft) to start the first engine 110, as disclosed in further detail herein.

As shown in FIG. 5, in the engine start mode, the valve 242 is closed, the check valve 244 is closed, the valve 246 is open, the valve 250 is closed, the valve 258 is open, the check valve 262 is closed, the valve 266 is open, and the brake 278 is disengaged (allows rotation of the input shaft 272). The valves are controlled by the valve controller 291 and the brake 278 is controlled by the brake controller 293. High-pressure air (e.g., at 50 psi) is supplied through the fourth fluid line 252 to the third fluid line 240. The high-pressure air can be supplied from one or more sources, such as a ground cart, an auxiliary power unit (APU) of the aircraft 100, and/or bleed air from the second engine 112 (assuming the second engine 112 has been started and is running). In some examples, the valve controller 291 opens a valve to enable high-pressure air to be supplied through the fourth fluid line 252 to the third fluid line 240. As shown by the dotted air flow line 500, the high-pressure air flows through the third fluid line 240 and through the precooler 248 and the valve 246. The high-pressure air flows through the fifth fluid line 256 and through the valve 258 to the auxiliary turbine 254. The high-pressure air flows through the auxiliary turbine 254, which drives the input shaft 272 of the differential 270. The air exits the auxiliary turbine 254 and flows through the sixth fluid line 260, the seventh fluid line 264, and the valve 266 and is dumped overboard (e.g., to the atmosphere). Therefore, the high-pressure air is directed through one of more of the fluid lines and through the auxiliary turbine 254.

As mentioned, the auxiliary turbine 254 is coupled to and drives the input shaft 272. Through the differential 270, torque is transferred to the first and second output shafts 274, 276. As mentioned above, the first gearbox 282 provides a negative gear ratio between the first output shaft 274 and the N1 shaft 222. During this engine start mode, the one-way clutch 283 prevents the first output shaft 274 from rotating the N1 shaft 222 backwards. Therefore, most or all of the torque is transferred through the second output shaft 276, which rotates the N2 shaft 224 to start the gas turbine engine 202. Therefore, during the engine start mode, the N1 shaft 222 is not driven by the auxiliary turbine 254. As the N2 shaft 224 is rotating, fuel is provided to the combustion chamber 220 and ignited. The combustion gasses start to drive the HPT 226 and the LPT 228, which drive the HPC 218 and the LPC 216, respectively, to start the gas turbine engine 202. During this engine start mode, the gearbox controller 294 can control (e.g., modulate) the second gear ratio R2 of the second gearbox 286 to improve (e.g., optimize) performance of the auxiliary turbine 254. Once the first engine 110 is started, the control system 288 may stop the supply of high-pressure air through the fourth fluid line 252 and then operate one or more valves to supply bleed air to the system(s) 232 in one or more of the other modes shown in FIGS. 6-8.

Figure 6:
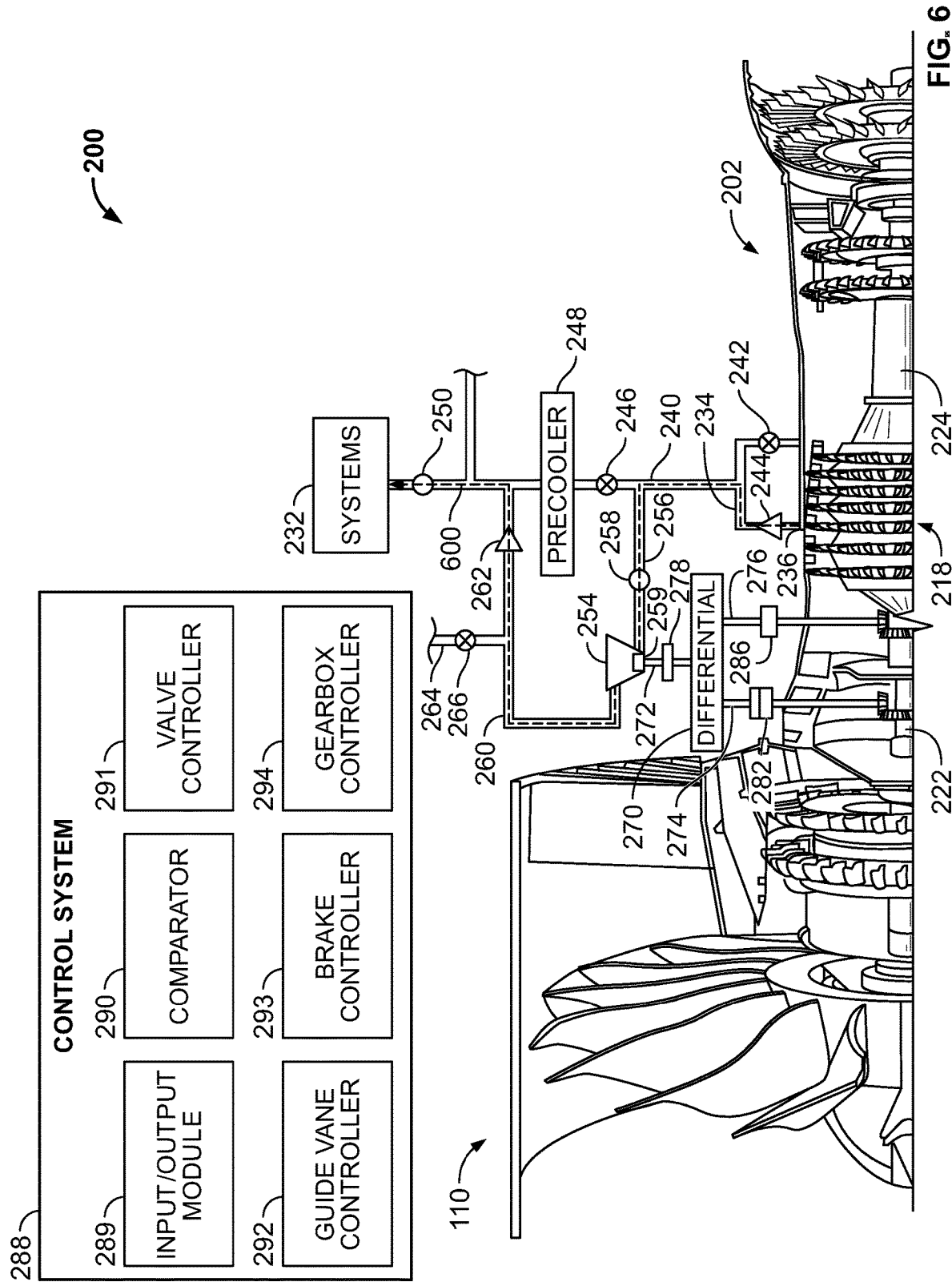
FIG. 6 shows the example power transfer system of FIG. 2 in a bleed energy recovery mode.

FIG. 6 shows the example system 200 during a second mode, referred to herein as a bleed energy recovery mode. In this mode, bleed air is extracted from the first engine 110 and provided to the system(s) 232. This mode typically occurs during climb or cruise phases of flight. As such, the gas turbine engine 202 is operating at a higher RPM and producing higher-pressure air. Therefore, in this mode, the bleed air can be extracted from a lower stage (e.g., the first bleed port 236) and provided to the system(s) 232. As disclosed in further detail below, in this mode, the auxiliary turbine 254 can be used to recover excess energy (pressure) in the bleed air produced by the gas turbine engine 202.

As shown in FIG. 6, in the bleed energy recovery mode, the valve 242 is closed, the check valve 244 is open, the valve 246 is closed, the valve 250 is open, the valve 258 is open, the check valve 262 is open, the valve 266 is closed, and the brake 278 is disengaged (allows rotation of the input shaft 272). As shown by the dotted air flow line 600, bleed air from the first bleed port 236 flows through the check valve 244, through the first fluid line 234, through the third fluid line 240, and through the fifth fluid line 256 and the valve 258 to the inlet of the auxiliary turbine 254. The bleed air flows through the auxiliary turbine 254, which drives the input shaft 272 of the differential 270. The bleed air exits the auxiliary turbine 254 and flows through the sixth fluid line 260, the check valve 262, the third fluid line 240, and the valve 250 to the system(s) 232.

In this example, the air flow path bypasses the precooler 248. Instead, the bleed air flows through the auxiliary turbine 254, which extracts (pressure) energy and drives the input shaft 272. This reduces the pressure and temperature of the bleed air at the turbine outlet, which is desirable to meet a specific pressure and temperature demanded by the system(s) 232. Through the differential 270, the input shaft 272 drives the first and second output shafts 274, 276 and, thus, drives the N2 shaft 224. Therefore, the power produced by the auxiliary turbine 254 in reducing the pressure and temperature of the bleed air is used to power the first engine 110. This improves fuel efficiency of the first engine 110 and therefore reduces fuel flow requirements to the first engine 110. In particular, less energy is wasted as compared to known systems where high-pressure bleed air is extracted and regulated down via a valve to the desired pressure. Thus, the example system 200 reduces the specific fuel consumption of the first engine 110.

During the bleed energy recovery mode, the guide vane controller 292 can control the variable inlet guide vanes 259 to regulate the pressure and temperature of the air exiting the auxiliary turbine 254 to match the pressure and temperature demands of the system(s) 232. Any extra horsepower generated by the auxiliary turbine 254 is put back into the differential 270, thereby improving fuel efficiency of the first engine 110.

Further, as disclosed above, the first gearbox 282 provides a negative (reverse) gear ratio between the first output shaft 274 and the N1 shaft 222. Also disclosed above, the gear ratio is relatively high, such as 5:1. Therefore, for every rotation for the N1 shaft 222, the first output shaft 274 rotates 5 times in the reverse direction. As such, while the gas turbine engine 202 is running, power is transferred through the differential 270 from the first output shaft 274 to the second output shaft 276 and, thus, from the N1 shaft 222 to the N2 shaft 224. This improves the stability margins of the engine. This also reduces the speed range of an engine accessory gearbox.

During the bleed energy recovery mode, the gearbox controller 294 can adjust the gear ratios in the first and second gearboxes 282, 286 to achieve an optimal RPM of the auxiliary turbine 254. Further, in some examples, the guide vane controller (292) can be used to modulate the variable inlet guide vanes 259 to achieve a desired output pressure of the auxiliary turbine. In some examples, at higher engine power conditions, the high gear ratio of 5:1 between the first output shaft 274 and the N1 shaft 222 could cause the input shaft 272 (Ng) to rotate in the reverse direction. Therefore, the first gear ratio R1 can be changed to enable the input shaft 272 (Ng) to run at a desired speed during climb or cruise. Additionally, adjusting the gear ratios of the first and second gearboxes 282, 286 has an effect on the power flow between the N1 and N2 shafts 222, 224. Therefore, the gearbox controller 294 can control the gearboxes 282, 286 to modulate the power transferred from the N1 shaft 22 to the N2 shaft 224. In some examples, if additional pressure and/or air flow is needed, the valve 242 can be opened (or partially opened) to extract bleed air from the higher stage of the HPC 218.

Figure 7:
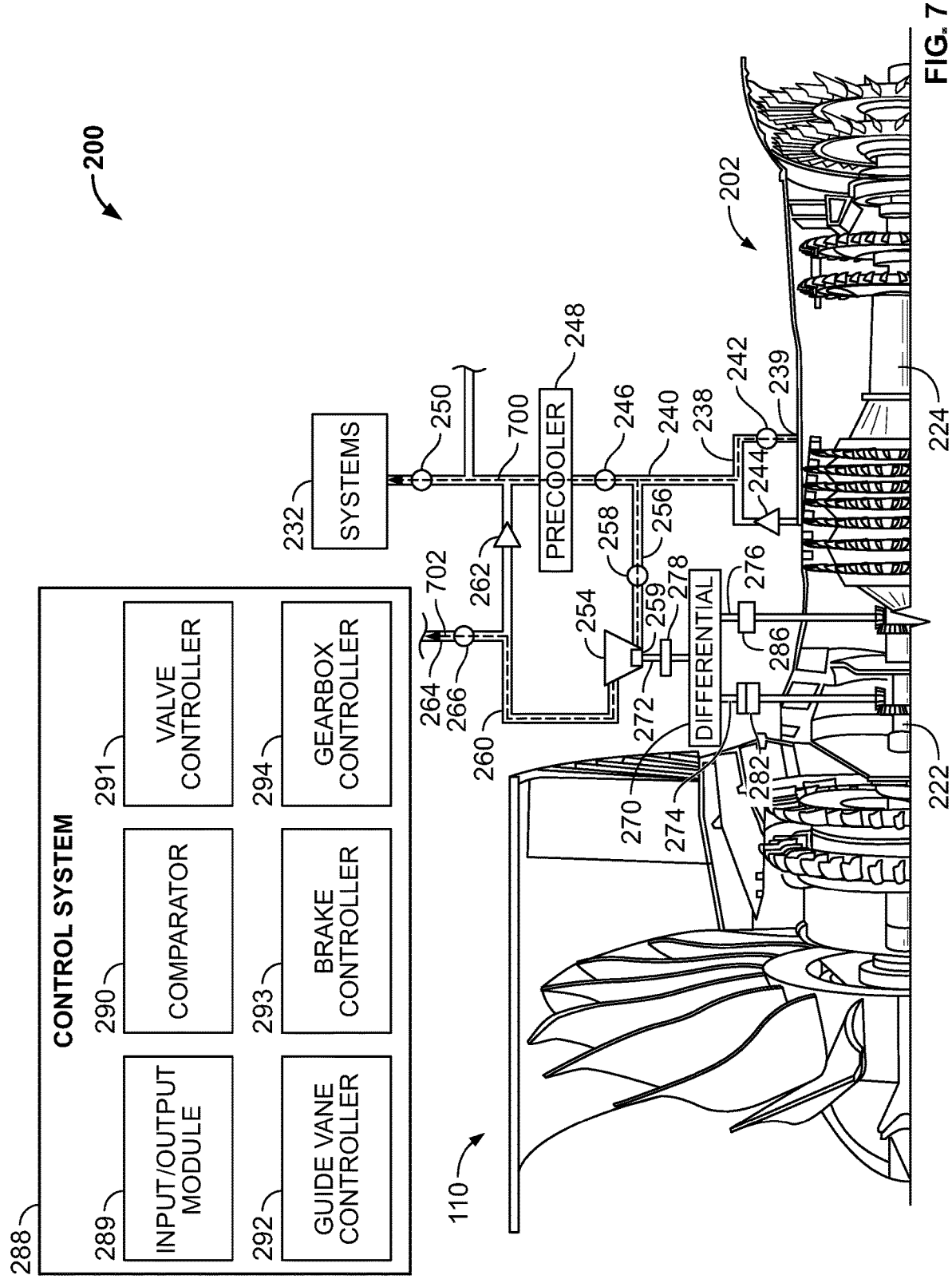
FIG. 7 shows the example power transfer system of FIG. 2 in a stability bleed valve mode.

FIG. 7 shows the example system 200 during a third mode, referred to herein as a stability bleed valve mode. In this mode, bleed air is extract from the first engine 110 and provided to the system(s) 232, while the auxiliary turbine 254 is used at certain times as a stability bleed valve for the first engine 110. This mode typically occurs while the engines are running during idle or above idle. As such, the gas turbine engine 202 is operating at a lower RPM and producing lower-pressure bleed air. Therefore, in this mode, the bleed air is extracted from a higher stage (e.g., the second bleed port 239). However, in other examples, this mode can also be implemented during higher RPMs.

Initially, in the stability bleed valve mode, the valve 242 is open, the check valve 244 is closed, the valve 246 is open, the valve 250 is open, the valve 258 is closed, the check valve 262 is closed, the valve 266 is closed, and the brake 278 is engaged (which locks or stops the input shaft 272). As shown by the dotted air flow line 700, high-pressure bleed air is extracted from the second bleed port 239. The bleed air flows through the second fluid line 238 and the valve 242, through the third fluid line 240 and through the valve 246 and the precooler 248, and through the valve 250 to the system(s) 232. The valve 246 can be opened and regulating (e.g., reducing) the pressure of the air to the desired pressure for the system(s) 232. During this time, the brake 278 is engaged and, thus, the input shaft 272 is not rotating. However, because the first gearbox 282 provides negative gear ratio, power is transferred through the differential 270 from the first output shaft 274 to the second output shaft 276 and, thus, from the N1 shaft 222 to the N2 shaft 224. The gearbox controller 294 can adjust the gear ratios in the first and second gearboxes 282, 286 achieve a desired power flow between the N1 and N2 shafts 222, 224.

If additional engine stability is needed, the brake 278 is disengaged, and the valve 258 and the valve 266 are opened. This allows a portion of the bleed air (shown by the dotted airflow line 702) from the third fluid line 240 to flow through the auxiliary turbine 254. The auxiliary turbine 254 drives the input shaft 272, which provides power to the N2 shaft 224. Further, power is transferred through the differential 270 from the first output shaft 274 to the second output shaft 276 and, thus, from the N1 shaft 222 to the N2 shaft 224. During this mode, the gearbox controller 294 can adjust the gear ratios in the first and second gearboxes 282, 286 to achieve an optimal RPM of the auxiliary turbine 254. Additionally, adjusting the first and second gearboxes has an effect on the power flow between the N1 and N2 shafts 222, 224.

Figure 8:
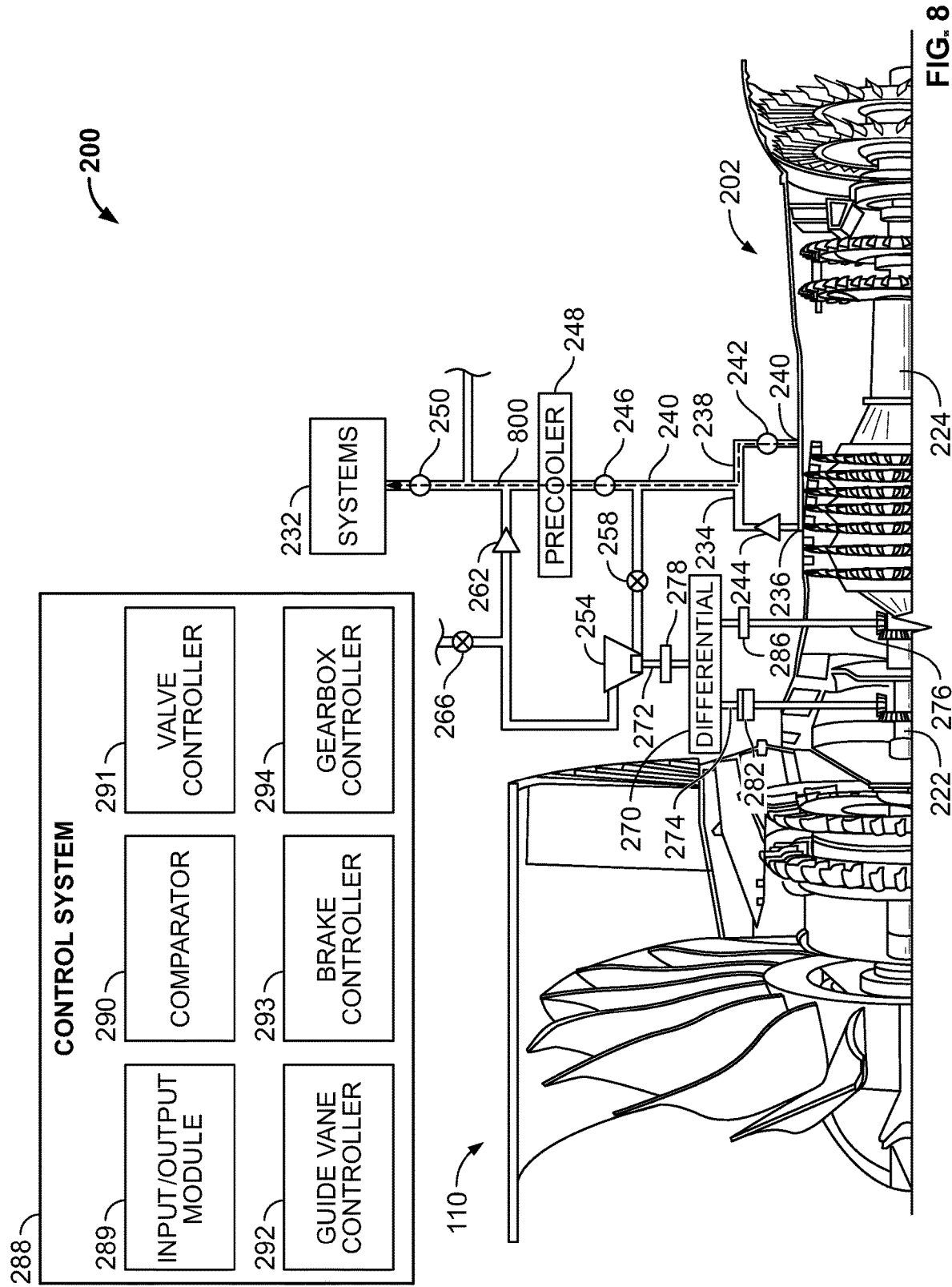
FIG. 8 shows the example power transfer system of FIG. 2 in a power transfer unit mode.

FIG. 8 shows the example system 200 during a fourth mode, referred to herein as a power transfer unit mode. In this mode, the system 200 is providing bleed air to the system(s) 232 using the two-port bleed air system, and the auxiliary turbine 254 is not being used. This mode may occur during phases of flight in which the gas turbine engine 202 produces bleed air at or near the pressure and temperature demands of the system(s) 232 and the gas turbine engine 202 is in need of shaft power transfer to improve engine operability margins.

As shown in FIG. 8, in this mode, the valve 242 is open, the check valve 244 is closed (or open depending on the pressure downstream), the valve 246 is open, the valve 250 is open, the valve 258 is closed, the check valve 262 is closed, the valve 266 is closed, and the brake 278 is engaged. As shown by the dotted air flow line 800, high-pressure bleed air is extracted from the second bleed port 239 and provided through the second fluid line 238 and the third fluid line 240 to the system(s) 232. Air flow is not provided through the auxiliary turbine 254. In this example, the brake 278 is engaged, which prevents the input shaft 272 from rotating. However, as noted above, the N1 and N2 shaft 222, 224 are still mechanically coupled via the differential 270. The first gearbox 282 provides a negative (reverse) gear ratio. As such, power is transferred from the N1 shaft 222 to the N2 shaft 224. During this mode, the first and second gearboxes 282, 286 can modulate the gear ratios to provide power transferer between the N1 and N2 shafts 222, 224.

During the example modes disclosed above, the sensor(s) 295, 296, 297 output signals (e.g., corresponding to the measured temperature, pressure, flow, etc. of the air) to the control system 288 via the input/output module 289. The comparator 290 compares the parameter values to various thresholds. If a parameter falls outside of a threshold, one or more of the devices of the system 200 can be controlled to the affect the operation of the system 200.

While an example manner of implementing the control system 288 of FIG. 2 is illustrated in FIGS. 2 and 5-8, one or more of the elements, processes, and/or devices illustrated in FIG. 2 may be combined, divided, re-arranged, omitted, eliminated, and/or implemented in any other way. Further, the example input/output module 289, the example comparator 290, the example valve controller 291, the example guide vane controller 292, the example brake controller 293, the example gearbox controller 294, and/or, more generally, the example control system 288 of FIG. 2, may be implemented by hardware alone or by hardware in combination with software and/or firmware. Thus, for example, any of the example input/output module 289, the example comparator 290, the example valve controller 291, the example guide vane controller 292, the example brake controller 293, the example gearbox controller 294, and/or, more generally, the example control system 288, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example control system 288 of FIG. 2 may include one or more elements, processes, and/or devices in addition to, or instead of, those illustrated in FIG. 2, and/or may include more than one of any or all of the illustrated elements, processes and devices.

Flowcharts representative of example machine readable instructions, which may be executed to configure processor circuitry to implement the control system 288 of FIG. 2, are shown in FIGS. 9A-9D. The machine readable instructions may be one or more executable programs or portion(s) of an executable program for execution by processor circuitry, such as the processor circuitry 1012 shown in the example processor platform 1000 discussed below in connection with FIG. 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 9A-9D, many other methods of implementing the example control system 288 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9A-9D may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 9A:
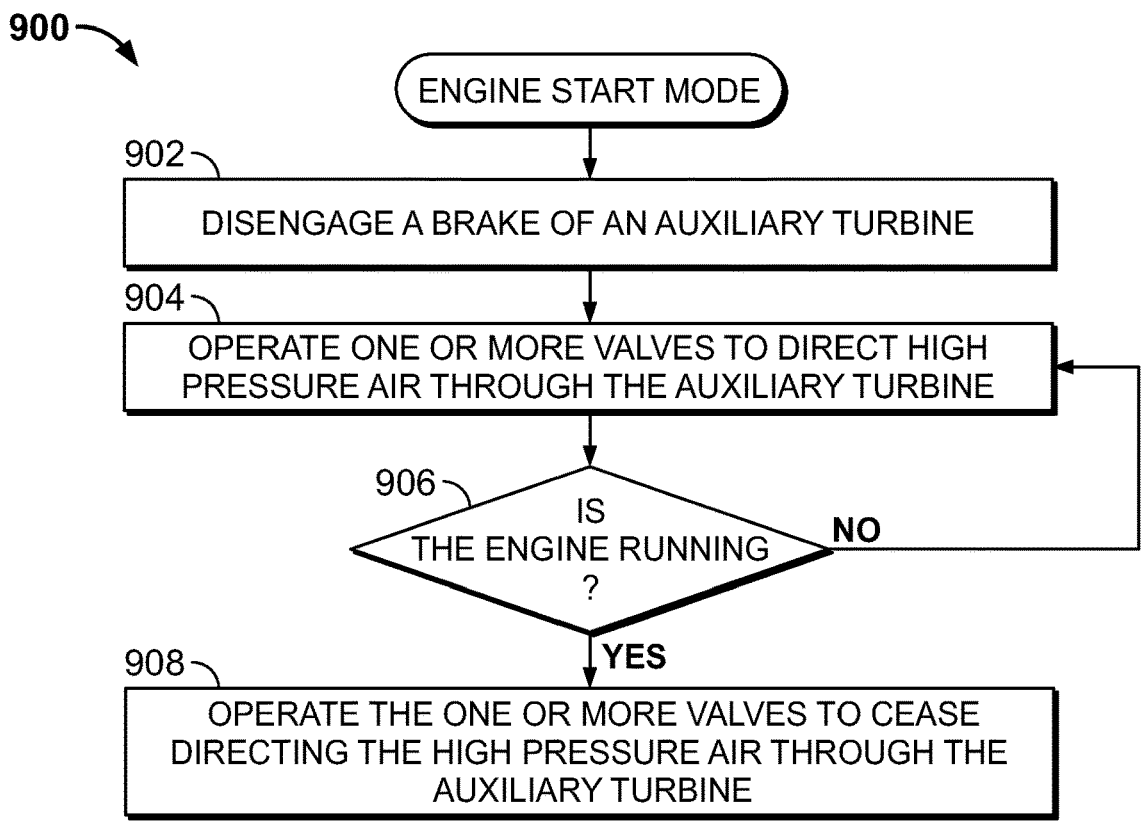
FIG. 9A is a flowchart representative of example machine readable instructions that may be implemented by an example control system of the example power transfer system of FIG. 2 to perform the example engine start mode shown in FIG. 5.

FIG. 9A is a flowchart representative of example machine readable instructions and/or example operations 900 that may be executed and/or instantiated by processor circuitry to operate the system 200 in the engine start mode as shown in FIG. 5 for starting the first engine 110.

At block 902, the brake controller 293 disengages the brake 278 of the auxiliary turbine 254. This enables the auxiliary turbine 254 to rotate the input shaft 272. At block 904, the valve controller 291 operates one or more of the valves to direct (e.g., route) high-pressure air through the auxiliary turbine 254. For example, as shown in FIG. 5, the valve 242 is closed, the valve 246 is open, the valve 250 is closed, the valve 258 is open, and the valve 266 is open. This routes the high-pressure air from the fourth fluid line 252 through the auxiliary turbine 254. As disclosed above, the auxiliary turbine 254 is operatively coupled to and drives the N2 shaft 224 (the high-pressure drive shaft) of the gas turbine engine 202. In particular, the auxiliary turbine 254 drives the input shaft 272, which, via the differential 270, drives the second output shaft 276 and thereby rotates the N2 shaft 224. As the N2 shaft 224 is rotating, fuel is injected into the combustion chamber 220 and ignited, which starts the gas turbine engine 202.

At block 906, the comparator 290 determines if the first engine 110 is running. For example, the comparator 290 may compare the shaft speed (e.g., measured by the sensor 297) to a speed threshold to determine if the first engine 110 is running. If the first engine 110 is not running, at block 904, the valve controller 291 continues to control the valves to route the high-pressure air through the auxiliary turbine 254. Otherwise, if the first engine 110 is running, at block 908, the valve controller 291 operates the valves to cease or shutoff the flow of high-pressure air. The control system 288 can then operate the devices of the system 200 in one of the other modes as disclosed in FIGS. 9B-9D.

Figure 9B:
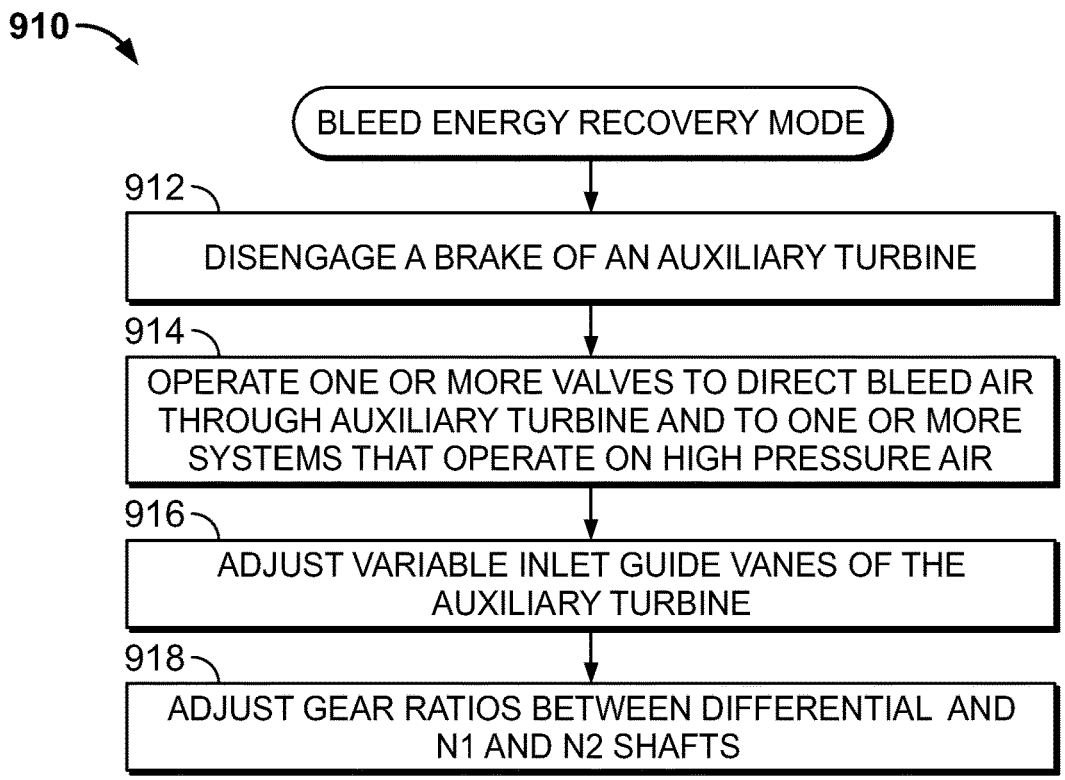
FIG. 9B is a flowchart representative of example machine readable instructions that may be implemented by an example control system of the example power transfer system of FIG. 2 to perform example bleed energy recovery mode shown in FIG. 6.

FIG. 9B is a flowchart representative of example machine readable instructions and/or example operations 910 that may be executed and/or instantiated by processor circuitry to operate the system 200 in the bleed energy recovery mode as shown in FIG. 6.

At block 912, the brake controller 293 disengages the brake 278 of the auxiliary turbine 254. This enables the auxiliary turbine 254 to rotate the input shaft 272. At block 914, the valve controller 291 operates one or more of the valves to direct (e.g., route) bleed air through the auxiliary turbine 254 and to the system(s) 232 that operate on bleed air. For example, as shown in FIG. 6, the valve 242 is open, the check valve 244 is open, the valve 246 is closed, the valve 250 is open, the valve 258 is open, the check valve 262 is open, and the valve 266 is closed. This routes the bleed air from the gas turbine engine 202 through the auxiliary turbine 254, which reduces the pressure and temperature of the air before reaching the system(s) 232. In some examples, if additional pressure and/or air flow is needed, the valve controller 291 can open the valve 242 to extract bleed air from the higher stage of the HPC 218. The auxiliary turbine 254 extracts energy from the bleed air and thereby drives the input shaft 272. The input shaft 272, via the differential 270, transfers power to the N2 shaft 224. As such, the power extracted by the auxiliary turbine 254 is put back into the gas turbine engine 202. Further, power from the N1 shaft 222 is transferred to the N2 shaft via the differential 270. Therefore, in this mode, the control system 288 can operate one or more of the valves to direct bleed air through the fluid lines to the auxiliary turbine 254 such that the auxiliary turbine 254 reduces a pressure of the bleed air and such that power extracted by the auxiliary turbine 254 drives the N2 shaft 224 of the gas turbine engine 202.

At block 916, the guide vane controller 292 adjusts the variable inlet guide vanes 259 of the auxiliary turbine 254, which adjusts the pressure and temperature of the bleed air at an outlet of the auxiliary turbine 254. For example, the variable inlet guide vanes 259 can be opened or closed to increase or decrease the pressure and temperature of the air exiting the auxiliary turbine 254 to match the desired temperature and pressure at the system(s) 232. Further, at block 918, the gearbox controller 294 adjusts the gear ratios between the differential 270 and the N1 and N2 shafts 222, 224. In particular, the gearbox controller 294 can control the first and second gearboxes 282, 286 to control the first and second gear ratios R1, R2. This can be used to achieve an optimal revolutions-per-minute (RPM) of the auxiliary turbine 254 as well as affect the power flow between the N1 and N2 shafts 222, 224.

Figure 9C:
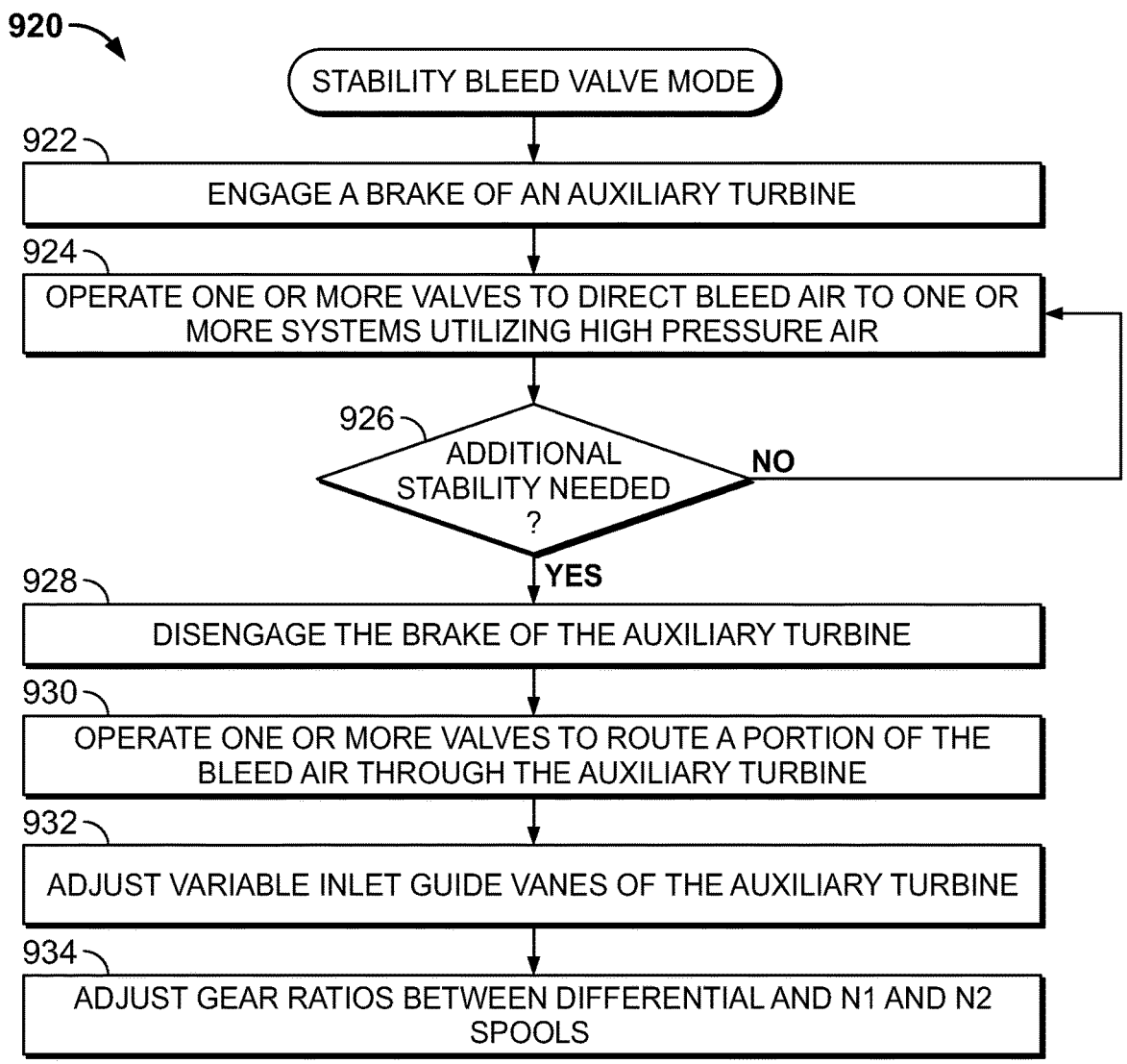
FIG. 9C is a flowchart representative of example machine readable instructions that may be implemented by an example control system of the example power transfer system of FIG. 2 to perform the example stability bleed valve mode shown in FIG. 7.

FIG. 9C is a flowchart representative of example machine readable instructions and/or example operations 920 that may be executed and/or instantiated by processor circuitry to operate the system 200 in the stability bleed valve mode as shown in FIG. 7.

At block 922, the brake controller 293 engages the brake 278 of the auxiliary turbine 254, which locks the input shaft 272. Because of the reverse gear ratio R1 between the N1 shaft 222 and the differential 270, power is still transferred from the N1 shaft 222 to the N2 shaft.

At block 924, the valve controller 291 operates one or more of the valves to direct (e.g., route) bleed air to the system(s) 232. For example, as shown in FIG. 7, the valve 242 is open, the check valve 244 is closed, the valve 246 is open, and the valve 250 is open. This routes the bleed air from the gas turbine engine 202 to the system(s) 232. At block 926, the comparator 290 determines if additional stability is needed. For example, the comparator 290 may compare one or more of the measured parameters to one or more thresholds. If additional stability is not needed, control proceeds back to block 924 and no changes are made. If additional stability is needed, at block 928, the brake controller 293 disengages the brake 278 of the auxiliary turbine 254. At block 930, the valve controller 291 operates one or more of the valves to direct bleed air through the auxiliary turbine 254. For example, the valve controller 291 opens the valve 258 and the valve 266, which routes a portion of the bleed air through the auxiliary turbine 254 and then to the atmosphere. Power extracted by the auxiliary turbine 254 is transferred via the differential 270 to the N2 shaft 224.

At block 932, the guide vane controller 292 can adjust the variable inlet guide vanes 259 of the auxiliary turbine 254 to achieve a desired pressure and temperature of the bleed air at an outlet of the auxiliary turbine 254. Further, at block 934, the gearbox controller 294 can adjust the gear ratios between the differential 270 and the N1 and N2 shafts 222, 224 to achieve a desired RPM of the auxiliary turbine 254 as well as affect the power flow between the N1 and N2 shafts 222, 224.

Figure 9D:
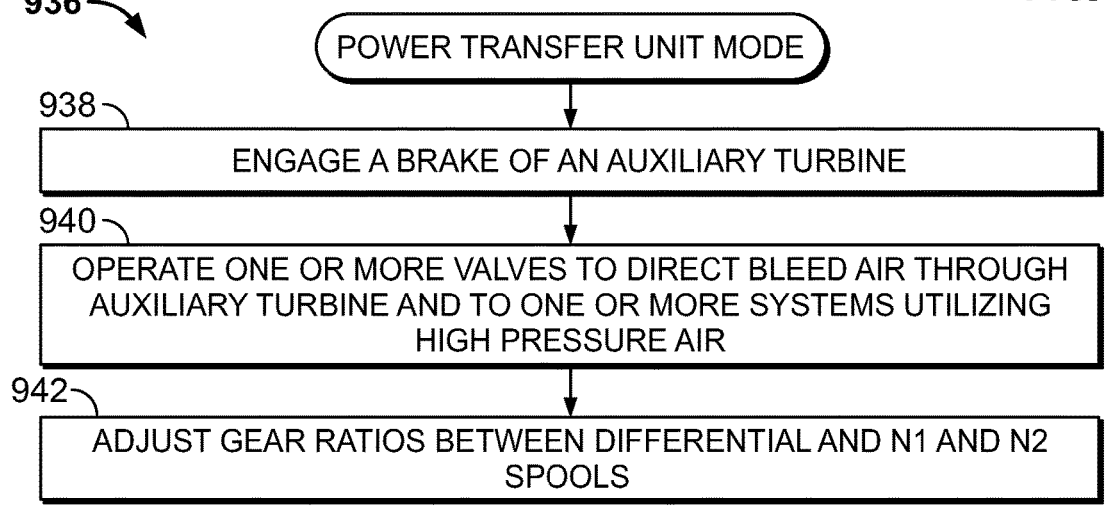
FIG. 9D is a flowchart representative of example machine readable instructions that may be implemented by an example control system of the example power transfer system of FIG. 2 to perform the example power transfer unit mode shown in FIG. 8.

FIG. 9D is a flowchart representative of example machine readable instructions and/or example operations 936 that may be executed and/or instantiated by processor circuitry to operate the system 200 in the power transfer unit mode as shown in FIG. 8.

At block 938, the brake controller 293 engages the brake 278 of the auxiliary turbine 254, which locks the input shaft 272. Because of the reverse gear ratio R1 between of the N1 shaft 222 and the differential 270, power is still transferred from the N1 shaft 222 to the N2 shaft.

At block 940, the valve controller 291 operates one or more of the valves to direct (e.g., route) bleed air to the system(s) 232. For example, as shown in FIG. 8, the valve 242 is open, the check valve 244 is closed (or opened depending on the downstream pressure), the valve 246 is open, the valve 250 is open, the valve 258 is closed, the check valve 262 is closed, and the valve 266 is closed. This routes the bleed air from the gas turbine engine 202 to the system(s) 232 without going through the auxiliary turbine 254. At block 942, the gearbox controller 294 can adjust the gear ratios between the differential 270 and the N1 and N2 shafts 222, 224 to affect the power flow between the N1 and N2 shafts 222, 224.

Figure 10:
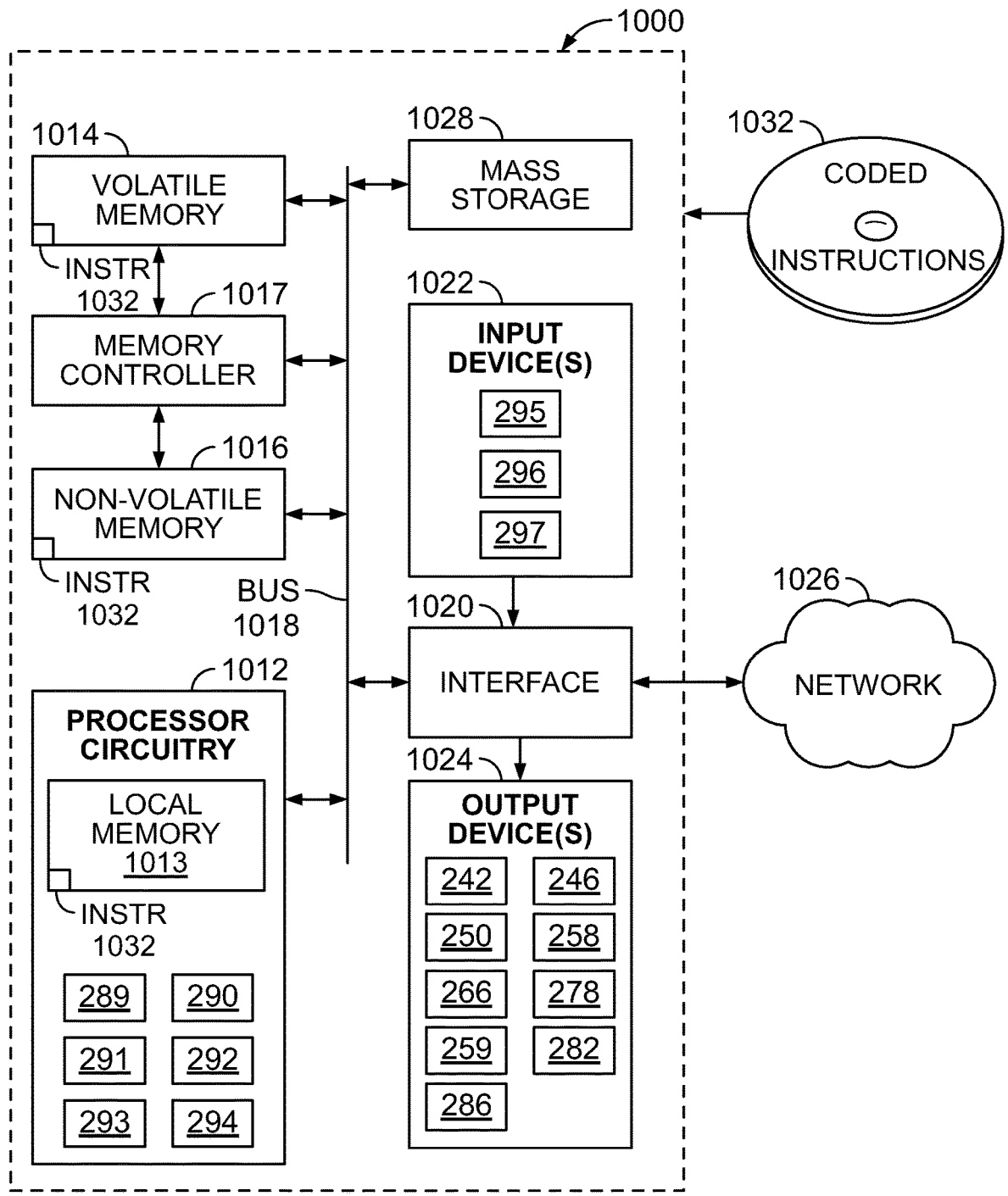
FIG. 10 is a block diagram of an example processing platform structured to execute the instructions of FIGS. 9A-9D to implement the example control system of the example power transfer system of FIG. 2.

FIG. 10 is a block diagram of an example processor platform 1000 structured to execute and/or instantiate the machine readable instructions and/or the operations of FIGS. 9A-9D to implement the control system 288 of FIG. 2. The processor platform 1000 can be, for example, an aircraft engine control unit (ECU), a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the input/output module 289, the comparator 290, the valve controller 291, the guide vane controller 292, the brake controller 293, and the gearbox controller 294.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user and/or device to enter data and/or commands into the processor circuitry 1012. The input device(s) 1022 include the sensors 295, 296, 297. Additionally or alternatively, the input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. In this example, the output device(s) 1024 include the valve 242, the valve 246, the valve 250, the valve 258, the valve 266, the brake 278, the variable inlet guide vanes 259, the first gearbox 282, and the second gearbox 286. Additionally or alternatively, the output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIGS. 9A-9D, may be stored in the mass storage device 1028, in the volatile memory 1014, in the non-volatile memory 1016, and/or on a removable non-transitory computer readable storage medium such as a CD or DVD.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

From the foregoing, it will be appreciated that example systems and methods have been disclosed that enable power to be transferred from a low-pressure drive shaft of a gas turbine engine to a high-pressure drive shaft of the gas turbine engine. This reduces the required compressor stability margin and enables improvements to engine efficiency. This also reduces the speed range of an engine accessory gearbox. The example systems and methods also harvest excess bleed energy, and convert the bleed energy into power that is put back into the engine, thereby improving the efficiency of the engine.

Examples and combinations of examples disclosed herein include the following:

Example 1 is an aircraft engine comprising a fan and a gas turbine engine to drive the fan. The gas turbine engine has a low-pressure drive shaft operatively coupling a low-pressure turbine and a low-pressure compressor and a high-pressure drive shaft operatively coupling a high-pressure turbine and a high-pressure compressor. The aircraft engine also comprises a power transfer system including a differential having an input shaft, a first output shaft in gear with the low-pressure drive shaft, and a second output shaft in gear with the high-pressure drive shaft, and a gearbox between the low-pressure drive shaft of the gas turbine engine and the first output shaft of the differential. The gearbox configured to provide power transfer through the differential from the low-pressure drive shaft to the high-pressure drive shaft.

Example 2 includes the aircraft engine of Example 1, wherein the gearbox is variable gear ratio gearbox.

Example 3 includes the aircraft engine of Examples 1 or 2, wherein the power transfer system includes processor circuitry to control the gearbox to modulate the power transferred from the low-pressure drive shaft to the high-pressure drive shaft.

Example 4 includes the aircraft engine of any of Examples 1-3, wherein the gearbox is a first gearbox, the power transfer system further including a second gearbox between the high-pressure drive shaft and the second output shaft of the differential.

Example 5 includes the aircraft engine of any of Examples 1-4, wherein the power transfer system includes an auxiliary turbine coupled to the input shaft of the differential.

Example 6 includes the aircraft engine of Example 5, wherein the power transfer system includes one or more fluid lines coupled between a bleed port on the gas turbine engine, the auxiliary turbine, and an aircraft system that operates on bleed air.

Example 7 includes the aircraft engine of Example 6, wherein the power transfer system includes processor circuitry to operate the power transfer system in a bleed energy recovery mode by operating one or more valves to direct bleed air through the fluid lines to the auxiliary turbine such that the auxiliary turbine reduces a pressure of the bleed air and such that power extracted by the auxiliary turbine drives the high-pressure drive shaft of the gas turbine engine.

Example 8 includes the aircraft engine of Example 7, wherein the auxiliary turbine includes variable inlet guide vanes, and wherein the processor circuitry is to adjust the variable inlet guide vanes to adjust the pressure of the bleed air at an outlet of the auxiliary turbine.

Example 9 includes the aircraft engine of Examples 7 or 8, wherein the processor circuitry is to operate the power transfer system in an engine start mode by operating one or more valves to direct high-pressure air through the fluid lines to the auxiliary turbine such that the auxiliary turbine drives the high-pressure drive shaft to start the aircraft engine.

Example 10 includes the aircraft engine of Example 9, wherein the power transfer system includes a one-way clutch between the gearbox and the first output shaft of the differential to limit the differential from driving the low-pressure drive shaft in a reverse direction during the engine start mode.

Example 11 includes the aircraft engine of any of Examples 4-10, wherein the power transfer system includes a brake coupled to the input shaft.

Example 12 is an aircraft comprising an aircraft system that operates on bleed air, a gas turbine engine having a high-pressure drive shaft and a low-pressure drive shaft, and a power transfer system including an auxiliary turbine, one or more fluid lines coupled between a bleed port on the gas turbine engine, the auxiliary turbine, and the aircraft system, and a differential having an input shaft, a first output shaft, and a second output shaft, the auxiliary turbine coupled to the input shaft, the second output shaft in gear with the high-pressure drive shaft of the gas turbine engine, such that during a first mode of operation, power is transferred from the auxiliary turbine to the high-pressure drive shaft of the gas turbine engine.

Example 13 includes the aircraft of Example 12, wherein the first output shaft of the differential is in gear with the low-pressure drive shaft of the gas turbine engine.

Example 14 includes the aircraft of Example 13, further including a first gearbox providing a first gear ratio between the first output shaft of the differential and the low-pressure drive shaft of the gas turbine engine, and a second gearbox providing a second gear ratio between the second output shaft of the differential and the high-pressure drive shaft of the gas turbine engine.

Example 15 includes the aircraft of Example 14, wherein the first gear ratio is a negative gear ratio and the second gear ratio is a positive gear ratio.

Example 16 includes the aircraft of Examples 14 or 15, wherein the power transfer system includes a one-way clutch between the first output shaft of the differential and the first gearbox.

Example 17 is a method comprising disengaging a brake of an auxiliary turbine, the auxiliary turbine coupled to an input shaft of a differential. The differential includes the input shaft, a first output shaft in gear with a low-pressure drive shaft of a gas turbine engine of an aircraft engine, and a second output shaft in gear with a high-pressure drive shaft of the gas turbine engine. The method also comprises operating one or more valves to direct bleed air from the gas turbine engine through the auxiliary turbine, wherein power extracted by the auxiliary turbine is transferred to the high-pressure drive shaft of the gas turbine engine.

Example 18 includes the method of Example 17, further including adjusting variable inlet guide vanes of the auxiliary turbine to adjust a pressure of the bleed air at an outlet of the auxiliary turbine.

Example 19 includes the method of Examples 17 or 18, further including adjusting a first gear ratio between the first output shaft and the low-pressure drive shaft and adjusting a second gear ratio between the second output shaft and the high-pressure drive shaft to affect power transfer from the low-pressure drive shaft to the high-pressure drive shaft.

Example 20 includes the method of Example 19, wherein the first gear ratio is a negative gear ratio.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. An aircraft engine comprising:
   a fan;
   a gas turbine engine to drive the fan, the gas turbine engine having a low-pressure drive shaft operatively coupling a low-pressure turbine and a low-pressure compressor and a high-pressure drive shaft operatively coupling a high-pressure turbine and a high-pressure compressor; and
   a power transfer system including:
      a differential having an input shaft, a first output shaft in gear with the low-pressure drive shaft, and a second output shaft in gear with the high-pressure drive shaft; and
      a gearbox between the low-pressure drive shaft of the gas turbine engine and the first output shaft of the differential, the gearbox configured to provide power transfer through the differential from the low-pressure drive shaft to the high-pressure drive shaft.

2. The aircraft engine of claim 1, wherein the gearbox is variable gear ratio gearbox.

3. The aircraft engine of claim 1, wherein the power transfer system includes processor circuitry to control the gearbox to modulate the power transferred from the low-pressure drive shaft to the high-pressure drive shaft.

4. The aircraft engine of claim 1, wherein the gearbox is a first gearbox, the power transfer system further including a second gearbox between the high-pressure drive shaft and the second output shaft of the differential.

5. The aircraft engine of claim 1, wherein the power transfer system includes an auxiliary turbine coupled to the input shaft of the differential.

6. The aircraft engine of claim 5, wherein the power transfer system includes one or more fluid lines coupled between a bleed port on the gas turbine engine, the auxiliary turbine, and an aircraft system that operates on bleed air.

7. The aircraft engine of claim 6, wherein the power transfer system includes processor circuitry to operate the power transfer system in a bleed energy recovery mode by operating one or more valves to direct bleed air through the fluid lines to the auxiliary turbine such that the auxiliary turbine reduces a pressure of the bleed air and such that power extracted by the auxiliary turbine drives the high-pressure drive shaft of the gas turbine engine.

8. The aircraft engine of claim 7, wherein the auxiliary turbine includes variable inlet guide vanes, and wherein the processor circuitry is to adjust the variable inlet guide vanes to adjust the pressure of the bleed air at an outlet of the auxiliary turbine.

9. The aircraft engine of claim 7, wherein the processor circuitry is to operate the power transfer system in an engine start mode by operating one or more valves to direct high-pressure air through the fluid lines to the auxiliary turbine such that the auxiliary turbine drives the high-pressure drive shaft to start the aircraft engine.

10. The aircraft engine of claim 9, wherein the power transfer system includes a one-way clutch between the gearbox and the first output shaft of the differential to limit the differential from driving the low-pressure drive shaft in a reverse direction during the engine start mode.

11. The aircraft engine of claim 5, wherein the power transfer system includes a brake coupled to the input shaft.

12. An aircraft comprising:
an aircraft system that operates on bleed air;
a gas turbine engine having a high-pressure drive shaft and a low-pressure drive shaft; and
a power transfer system including:
an auxiliary turbine;
one or more fluid lines coupled between a bleed port on the gas turbine engine, the auxiliary turbine, and the aircraft system; and
a differential having an input shaft, a first output shaft, and a second output shaft, the auxiliary turbine coupled to the input shaft, the second output shaft in gear with the high-pressure drive shaft of the gas turbine engine, such that during a first mode of operation, power is transferred from the auxiliary turbine to the high-pressure drive shaft of the gas turbine engine.

13. The aircraft of claim 12, wherein the first output shaft of the differential is in gear with the low-pressure drive shaft of the gas turbine engine.

14. The aircraft of claim 13, further including a first gearbox providing a first gear ratio between the first output shaft of the differential and the low-pressure drive shaft of the gas turbine engine, and a second gearbox providing a second gear ratio between the second output shaft of the differential and the high-pressure drive shaft of the gas turbine engine.

15. The aircraft of claim 14, wherein the first gear ratio is a negative gear ratio and the second gear ratio is a positive gear ratio.

16. The aircraft of claim 14, wherein the power transfer system includes a one-way clutch between the first output shaft of the differential and the first gearbox.

17. A method comprising:
disengaging a brake of an auxiliary turbine, the auxiliary turbine coupled to an input shaft of a differential, the differential including:
the input shaft;
a first output shaft in gear with a low-pressure drive shaft of a gas turbine engine of an aircraft engine; and
a second output shaft in gear with a high-pressure drive shaft of the gas turbine engine; and
operating one or more valves to direct bleed air from the gas turbine engine through the auxiliary turbine, wherein power extracted by the auxiliary turbine is transferred to the high-pressure drive shaft of the gas turbine engine.

18. The method of claim 17, further including adjusting variable inlet guide vanes of the auxiliary turbine to adjust a pressure of the bleed air at an outlet of the auxiliary turbine.

19. The method of claim 17, further including adjusting a first gear ratio between the first output shaft and the low-pressure drive shaft and adjusting a second gear ratio between the second output shaft and the high-pressure drive shaft to affect power transfer from the low-pressure drive shaft to the high-pressure drive shaft.

20. The method of claim 19, wherein the first gear ratio is a negative gear ratio.

* * * * *